United States Patent
Mitsui

(10) Patent No.: US 9,754,189 B2
(45) Date of Patent: Sep. 5, 2017

(54) DETECTION DEVICE, LEARNING DEVICE, DETECTION METHOD, LEARNING METHOD, AND INFORMATION STORAGE DEVICE

(71) Applicant: OLYMPUS CORPORATION, Tokyo (JP)

(72) Inventor: Masanori Mitsui, Machida (JP)

(73) Assignee: OLYMPUS CORPORATION, Tokyo (JP)

( * ) Notice: Subject to any disclaimer, the term of this patent is extended or adjusted under 35 U.S.C. 154(b) by 0 days.

(21) Appl. No.: 14/879,532

(22) Filed: Oct. 9, 2015

(65) Prior Publication Data
US 2016/0034787 A1 Feb. 4, 2016

Related U.S. Application Data

(63) Continuation of application No. PCT/JP2014/064663, filed on Jun. 3, 2014.

(30) Foreign Application Priority Data

Jun. 24, 2013 (JP) .................................. 2013-131343

(51) Int. Cl.
*G06K 9/62* (2006.01)
*G09G 3/36* (2006.01)
(Continued)

(52) U.S. Cl.
CPC ............. *G06K 9/6257* (2013.01); *G06K 9/44* (2013.01); *G06K 9/6256* (2013.01); *G06T 7/77* (2017.01);
(Continued)

(58) Field of Classification Search
None
See application file for complete search history.

(56) References Cited

U.S. PATENT DOCUMENTS 5,573,006 A 11/1996 Shimotani et al.
5,754,676 A 5/1998 Komiya et al.
(Continued)

FOREIGN PATENT DOCUMENTS

EP 2 067 432 A2 6/2009
EP 2 446 809 A1 5/2012
(Continued)

OTHER PUBLICATIONS

International Search Report dated Sep. 9, 2014 issued in PCT/JP2014/064663.
(Continued)

*Primary Examiner* — Delomia L Gilliard
(74) *Attorney, Agent, or Firm* — Scully, Scott, Murphy & Presser, P.C.

(57) ABSTRACT

A detection device includes an image acquisition section that acquires an image that has been captured by an imaging section, and includes an image of an object, a distance information acquisition section that acquires distance information about the distance from the imaging section to the object, a feature quantity calculation section that calculates a feature quantity from the image, a learning feature quantity storage section that stores a learning feature quantity calculated by a learning process corresponding to each of a plurality of distance ranges that are set corresponding to the distance from the imaging section to the object, and a detection section that determines a distance range that corresponds to the feature quantity based on the distance information, and detects the target area based on the learning feature quantity that corresponds to the determined distance range, and the feature quantity calculated by the feature quantity calculation section.

11 Claims, 16 Drawing Sheets

(51) Int. Cl.
*H04N 5/374* (2011.01)
*G06K 9/44* (2006.01)
*G06T 7/77* (2017.01)
*H04N 13/02* (2006.01)
*H04N 13/00* (2006.01)

(52) U.S. Cl.
CPC ............ *G09G 3/36* (2013.01); *H04N 5/374* (2013.01); *G06K 2209/05* (2013.01); *G06T 2207/10012* (2013.01); *G06T 2207/10048* (2013.01); *G06T 2207/30088* (2013.01); *G06T 2207/30101* (2013.01); *H04N 13/0203* (2013.01); *H04N 2013/0081* (2013.01); *H04N 2013/0092* (2013.01)

(56) References Cited

U.S. PATENT DOCUMENTS

| | | |
|---|---|---|
| 2008/0279431 A1 | 11/2008 | Kitamura |
| 2009/0202145 A1* | 8/2009 | Yokono ............... G06K 9/00362 |
| | | 382/160 |
| 2011/0026849 A1* | 2/2011 | Kameyama ........... G06T 3/4053 |
| | | 382/260 |
| 2011/0158535 A1* | 6/2011 | Iio ........................ G06K 9/4642 |
| | | 382/190 |
| 2011/0254937 A1 | 10/2011 | Yoshino |

FOREIGN PATENT DOCUMENTS

| | | |
|---|---|---|
| JP | H07-0249197 A | 9/1995 |
| JP | 2002-150440 A | 5/2002 |
| JP | 2002-342758 A | 11/2002 |
| JP | 2009-029340 A | 2/2009 |
| JP | 2009029340 A * | 2/2009 |
| JP | 2011-224038 A | 11/2011 |

OTHER PUBLICATIONS

Partial Supplementary European Search Report dated Feb. 22, 2017 in European Patent Application No.14 81 8280.1.
Sung Wook Baik et al., "Adaptive Object Recognition with Image Feature Interpolation", Network and Parallel Computing, 2004, vol. 3339, pp. 943-948.
Extended Supplementary European Search Report dated Jun. 29, 2017 in European Patent Application No. 14 81 8280.1.

* cited by examiner

| DISTANCE RANGE | 1 | 2 | ... | N |
|---|---|---|---|---|
| DISTANCE INFORMATION | $d_1 \leqq d < d_2$ | $d_2 \leqq d < d_3$ | ... | $d_N \leqq d$ |
| LEARNING FEATURE QUANTITY | $f_1$ | $f_2$ | ... | $f_N$ |

CLOSING PROCESS

DETECTION OF CONCAVE PARTS

OPENING PROCESS

DETECTION OF CONVEX PARTS

FIG. 16F   CHANGE RADIUS OF SPHERE
CORRESPONDING TO DISTANCE

PART OF DISTANCE MAP
OBJECT IS CAPTURED MORE DARKLY AS DISTANCE INCREASES,
AND CAPTURED MORE BRIGHTLY AS DISTANCE DECREASES

⬇ SUBTRACTION

CHANGE CHARACTERISTICS OF LOW-PASS FILTER
CORRESPONDING TO DISTANCE

PART OF DISTANCE MAP
OBJECT IS CAPTURED MORE DARKLY AS DISTANCE INCREASES,
AND CAPTURED MORE BRIGHTLY AS DISTANCE DECREASES

DETECTION DEVICE, LEARNING DEVICE, DETECTION METHOD, LEARNING METHOD, AND INFORMATION STORAGE DEVICE

CROSS REFERENCE TO RELATED APPLICATION

This application is a continuation of International Patent Application No. PCT/JP2014/064663, having an international filing date of Jun. 3, 2014, which designated the United States, the entirety of which is incorporated herein by reference. Japanese Patent Application No. 2013-131343 filed on Jun. 24, 2013 is also incorporated herein by reference in its entirety.

BACKGROUND

The present invention relates to a detection device, a learning device, a detection method, a learning method, an information storage device, and the like.

A narrow band imaging (NBI) technique applies narrow-band illumination light (that is easily absorbed by hemoglobin in blood) to tissue to enhance (highlight) the capillaries and the like within the surface of the mucous membrane (see JP-A-2011-224038). It is considered that the narrow band imaging technique can be used as an alternative to a dye-spraying observation technique that is widely used to finely observe (examine) the gullet, or observe the pit pattern (gland duct structure) of the large intestine, and contributes to an improvement in examination efficiency through a reduction in the examination time and the need to perform biopsy.

JP-A-2002-342758 discloses a technique that recognizes or extracts a specific area from an image using a learning process. Specifically, JP-A-2002-342758 discloses a process that learns (learns about) the extraction target area, and extracts a specific area from the input image using a parameter calculated by learning.

An identical feature that has been acquired as an image may show different characteristics depending on the distance from the imaging device to the object, due to a difference in illumination state, a difference in intensity, or the like. If the feature quantities that correspond to different characteristics are classified into an identical category, the learning data may show a large variation in feature quantity within the category. As a result, the determination accuracy (i.e., the accuracy of the learning result) and the detection accuracy may deteriorate. It may be possible to implement stable detection by acquiring distance information together with an image, and performing a detection process. JP-A-2002-342758 discloses a robot visual recognition system that utilizes an image and distance information. The system disclosed in JP-A-2002-342758 normalizes the acquired image using the distance, and performs a learning process and a recognition process. In JP-A-2002-342758, the size or the pattern fineness that differs depending on the distance is corrected using the distance information.

SUMMARY

According to one aspect of the invention, there is provided a detection device comprising:

an image acquisition section that acquires an image that has been captured by an imaging section, and includes an image of an object;

a distance information acquisition section that acquires distance information based on a distance from the imaging section to the object when the imaging section captured the image;

a feature quantity calculation section that calculates a feature quantity relating to the object from the acquired image;

a learning feature quantity storage section that stores a learning feature quantity that has been calculated by a learning process corresponding to each of a plurality of distance ranges and corresponds to each of the plurality of distance ranges, the plurality of distance ranges being set corresponding to the distance from the imaging section to the object; and a detection section that detects a target area from the image based on the learning feature quantity, the distance information, and the feature quantity, the detection section determining a distance range that corresponds to the feature quantity calculated by the feature quantity calculation section from the plurality of distance ranges based on the distance information acquired by the distance information acquisition section, and detecting the target area based on the learning feature quantity that corresponds to the determined distance range, and the feature quantity calculated by the feature quantity calculation section.

According to another aspect of the invention, there is provided a learning device comprising:

an image acquisition section that acquires an image that has been captured by an imaging section, and includes an image of an object;

a distance information acquisition section that acquires distance information based on a distance from the imaging section to the object when the imaging section captured the image;

a feature quantity calculation section that calculates a feature quantity relating to the object from the acquired image;

a learning section that sets a plurality of distance ranges corresponding to the distance information acquired by the distance information acquisition section, and performs a learning process on the feature quantity corresponding to each of the plurality of distance ranges; and a learning feature quantity storage section that stores a learning feature quantity calculated by the learning process performed by the learning section.

According to another aspect of the invention, there is provided a detection method comprising causing a computer to perform:

a process that acquires an image that has been captured by an imaging section, and includes an image of an object;

a distance information acquisition process that acquires distance information based on a distance from the imaging section to the object when the imaging section captured the image;

a feature quantity calculation process that calculates a feature quantity relating to the object from the acquired image;

a learning feature quantity storage process that stores a learning feature quantity that has been calculated by a learning process corresponding to each of a plurality of distance ranges and corresponds to each of the plurality of distance ranges, the plurality of distance ranges being set corresponding to the distance from the imaging section to the object; and a detection process that detects a target area from the image based on the learning feature quantity, the distance information, and the feature quantity, the detection process including performing a process that determines a distance range that corresponds to the feature quantity calculated by the feature quantity calculation process from the plurality of distance ranges based on the distance information acquired by the distance information acquisition process, and detects the target area based on the learning feature quantity that corresponds to the determined distance range, and the feature quantity calculated by the feature quantity calculation process.

According to another aspect of the invention, there is provided a learning method comprising causing a computer to perform:

a process that acquires an image that has been captured by an imaging section, and includes an image of an object;

a distance information acquisition process that acquires distance information based on a distance from the imaging section to the object when the imaging section captured the image;

a feature quantity calculation process that calculates a feature quantity relating to the object from the acquired image;

a learning process that sets a plurality of distance ranges corresponding to the distance information acquired by the distance information acquisition process, and performs a learning process on the feature quantity corresponding to each of the plurality of distance ranges; and a learning feature quantity storage process that stores a learning feature quantity calculated by the learning process.

According to another aspect of the invention, there is provided an information storage device storing a program that causes a computer to perform steps of:

acquiring an image that has been captured by an imaging section, and includes an image of an object;

acquiring distance information based on a distance from the imaging section to the object when the imaging section captured the image;

calculating feature quantity relating to the object from the acquired image;

storing a learning feature quantity that has been calculated by a learning process corresponding to each of a plurality of distance ranges and corresponds to each of the plurality of distance ranges, the plurality of distance ranges being set corresponding to the distance from the imaging section to the object; and detecting a target area from the image based on the learning feature quantity, the distance information, and the feature quantity, the detecting of the target area including performing a process that determines a distance range that corresponds to the feature quantity from the plurality of distance ranges based on the distance information, and detects the target area based on the learning feature quantity that corresponds to the determined distance range, and the feature quantity.

According to another aspect of the invention, there is provided an information storage device storing a program that causes a computer to perform steps of:

acquiring an image that has been captured by an imaging section, and includes an image of an object;

acquiring distance information based on a distance from the imaging section to the object when the imaging section captured the image;

calculating a feature quantity relating to the object from the acquired image;

setting a plurality of distance ranges corresponding to the distance information, and performing a learning process on the feature quantity corresponding to each of the plurality of distance ranges; and storing a learning feature quantity calculated by the learning process.

BRIEF DESCRIPTION OF THE DRAWINGS

FIGS. 16A to 16F are views illustrating a process that extracts extracted concavity-convexity information using a morphological process.

DESCRIPTION OF EXEMPLARY EMBODIMENTS

Figure 1:
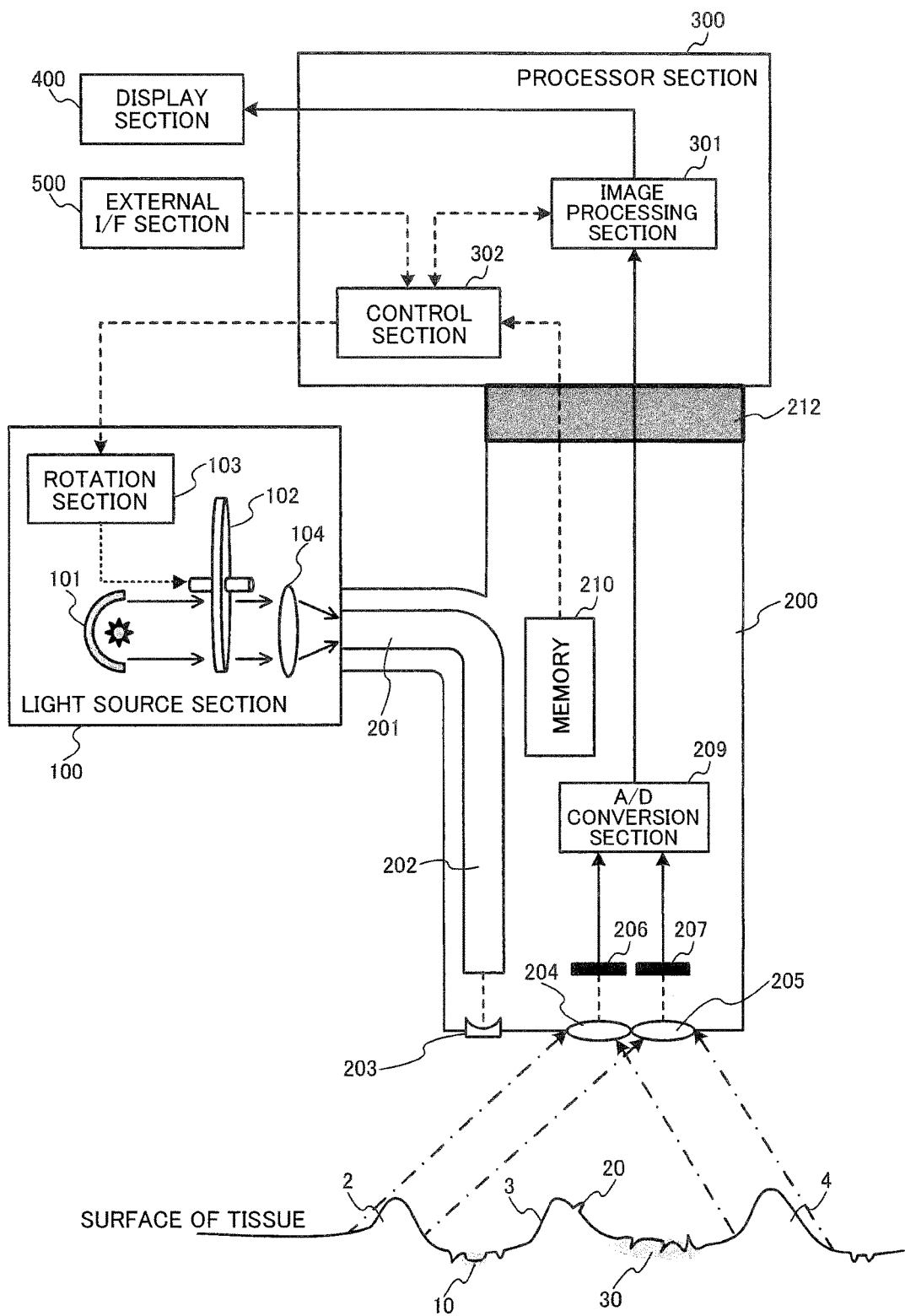
FIG. 1 illustrates a configuration example of an endoscope apparatus that includes a detection device according to one embodiment of the invention.

According to one embodiment of the invention, there is provided a detection device comprising:

an image acquisition section that acquires an image that has been captured by an imaging section, and includes an image of an object;

a distance information acquisition section that acquires distance information based on a distance from the imaging section to the object when the imaging section captured the image;

a feature quantity calculation section that calculates a feature quantity relating to the object from the acquired image;

a learning feature quantity storage section that stores a learning feature quantity that has been calculated by a learning process corresponding to each of a plurality of distance ranges and corresponds to each of the plurality of distance ranges, the plurality of distance ranges being set corresponding to the distance from the imaging section to the object; and a detection section that detects a target area from the image based on the learning feature quantity, the distance information, and the feature quantity, the detection section determining a distance range that corresponds to the feature quantity calculated by the feature quantity calculation section from the plurality of distance ranges based on the distance information acquired by the distance information acquisition section, and detecting the target area based on the learning feature quantity that corresponds to the determined distance range, and the feature quantity calculated by the feature quantity calculation section.

According to another embodiment of the invention, there is provided a learning device comprising:

an image acquisition section that acquires an image that has been captured by an imaging section, and includes an image of an object;

a distance information acquisition section that acquires distance information based on a distance from the imaging section to the object when the imaging section captured the image;

a feature quantity calculation section that calculates a feature quantity relating to the object from the acquired image;

a learning section that sets a plurality of distance ranges corresponding to the distance information acquired by the distance information acquisition section, and performs a learning process on the feature quantity corresponding to each of the plurality of distance ranges; and a learning feature quantity storage section that stores a learning feature quantity calculated by the learning process performed by the learning section.

According to another embodiment of the invention, there is provided a detection method comprising causing a computer to perform:

a process that acquires an image that has been captured by an imaging section, and includes an image of an object;

a distance information acquisition process that acquires distance information based on a distance from the imaging section to the object when the imaging section captured the image;

a feature quantity calculation process that calculates a feature quantity relating to the object from the acquired image;

a learning feature quantity storage process that stores a learning feature quantity that has been calculated by a learning process corresponding to each of a plurality of distance ranges and corresponds to each of the plurality of distance ranges, the plurality of distance ranges being set corresponding to the distance from the imaging section to the object; and a detection process that detects a target area from the image based on the learning feature quantity, the distance information, and the feature quantity, the detection process including performing a process that determines a distance range that corresponds to the feature quantity calculated by the feature quantity calculation process from the plurality of distance ranges based on the distance information acquired by the distance information acquisition process, and detects the target area based on the learning feature quantity that corresponds to the determined distance range, and the feature quantity calculated by the feature quantity calculation process.

According to another embodiment of the invention, there is provided a learning method comprising causing a computer to perform:

a process that acquires an image that has been captured by an imaging section, and includes an image of an object;

a distance information acquisition process that acquires distance information based on a distance from the imaging section to the object when the imaging section captured the image;

a feature quantity calculation process that calculates a feature quantity relating to the object from the acquired image;

a learning process that sets a plurality of distance ranges corresponding to the distance information acquired by the distance information acquisition process, and performs a learning process on the feature quantity corresponding to each of the plurality of distance ranges; and a learning feature quantity storage process that stores a learning feature quantity calculated by the learning process.

According to another embodiment of the invention, there is provided an information storage device storing a program that causes a computer to perform steps of:

acquiring an image that has been captured by an imaging section, and includes an image of an object;

acquiring distance information based on a distance from the imaging section to the object when the imaging section captured the image;

calculating feature quantity relating to the object from the acquired image;

storing a learning feature quantity that has been calculated by a learning process corresponding to each of a plurality of distance ranges and corresponds to each of the plurality of distance ranges, the plurality of distance ranges being set corresponding to the distance from the imaging section to the object; and detecting a target area from the image based on the learning feature quantity, the distance information, and the feature quantity, the detecting of the target area including performing a process that determines a distance range that corresponds to the feature quantity from the plurality of distance ranges based on the distance information, and detects the target area based on the learning feature quantity that corresponds to the determined distance range, and the feature quantity.

According to another embodiment of the invention, there is provided an information storage device storing a program that causes a computer to perform steps of:

acquiring an image that has been captured by an imaging section, and includes an image of an object;

acquiring distance information based on a distance from the imaging section to the object when the imaging section captured the image;

calculating a feature quantity relating to the object from the acquired image;

setting a plurality of distance ranges corresponding to the distance information, and performing a learning process on the feature quantity corresponding to each of the plurality of distance ranges; and storing a learning feature quantity calculated by the learning process.

Exemplary embodiments of the invention are described below. Note that the following embodiments do not in any way limit the scope of the invention laid out in the claims. Note also that all of the elements described in connection with the following embodiments should not necessarily be taken as essential elements of the invention.

1. Method

A method used in connection with the embodiments of the invention is described below. When it is desired to preserve the nerves while completely removing the rectum or the prostate, it is necessary to expose and remove the target internal organ so as not to damage the nerves that are distributed to surround the target internal organ. However, since thin nerves having a diameter of 50 to 300 µm are white or transparent, it is difficult to observe such nerves even by zoom observation using a laparoscope. Therefore, the doctor must rely on his/her experience and intuition, and it is likely that the nerves are damaged. A technique has been proposed that focuses on the fact that the nerves that surround the target internal organ are situated in the fat layer, and extracts the fat situated around the nerves in order to visualize the nerves and prevent a situation in which the nerves that surround the target internal organ are damaged. Taking an example of the fat detection technique that is used to suppress nerve damage, it is useful to calculate a feature quantity relating to the object from an image, and detect the desired object using the calculated feature quantity. When using the fat detection technique, the feature quantity relating to the object refers to the color, the brightness, the color difference, and the like. The following description is given taking an example in which the feature quantity is the color, the brightness, the color difference, and the like. Note that the feature quantity is not limited to the color, the brightness, the color difference, and the like. Various types of information (e.g., shape information about the object acquired using an edge detection process) other than the color, the brightness, the color difference, and the like may also be used as the feature quantity.

Figure 10A:
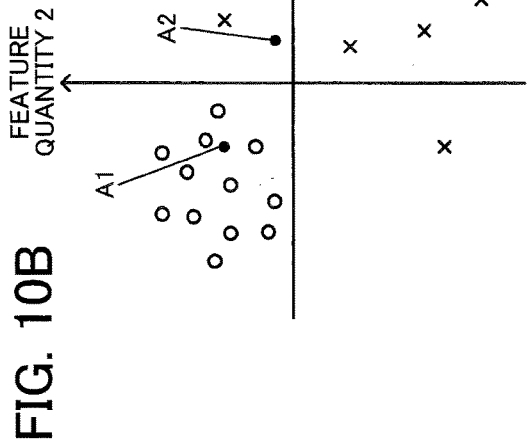
FIGS. 10A to 10D are views illustrating an example of a learning process.

When implementing such a determination process (i.e., the detection process that detects the desired object), it is useful to perform a learning process, and utilize the result of the learning process (hereinafter referred to as "learning result" (classification model in a narrow sense)). A specific example of the learning process is briefly described below. A single piece of processing target data is represented by a single feature quantity, or represented by a set of feature quantities. For example, when using the brightness value Y of an image as the feature quantity, a single piece of processing target data is represented by the brightness value Y. When using the pixel values (R, G, B) of a color image as the feature quantity, a single piece of processing target data is represented by a set of pixel values (R, G, B). Note that the feature quantity calculated from an image is not limited to the pixel values (RGB) and the brightness/color difference (YCrCb). The results obtained by performing a feature quantity calculation process on these values may be used as the feature quantity. In this case, a single piece of processing target data can be plotted as one point within a feature quantity space in which one axis is assigned to one feature quantity. FIG. 10A illustrates an example in which two feature quantities are used. In this case, the feature quantity space is represented by a plane (feature quantity plane), and a single piece of processing target data corresponds to one point in the plane.

Figure 10B:
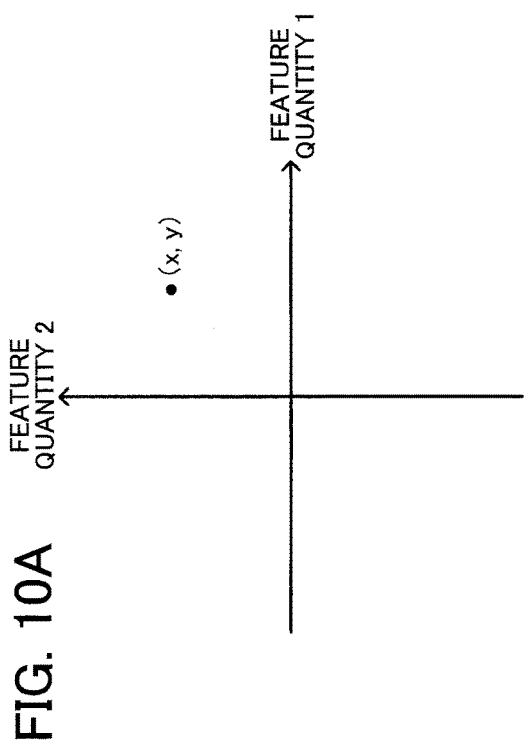

When implementing general learning (particularly supervised learning), given data is input during the learning process together with correct answer/incorrect answer information. For example, an input value is input together with information that represents that the input value (feature quantity) is (or is not) fat. The learning process plots such data (that is known to be a correct answer or an incorrect answer) in the feature quantity space. FIG. 10B illustrates an example of the plotting results. In FIG. 10B, each circle indicates the position of correct answer data, and each cross indicates the position of incorrect answer data. When the feature quantity is appropriately set (i.e., when the feature quantity differs in value corresponding to whether the data is a correct answer or an incorrect answer), the correct answer data is plotted in a given area within the feature quantity space, and the incorrect answer data is plotted in an area that differs from that of the correct answer data (see FIG. 10B).

Figure 10C:
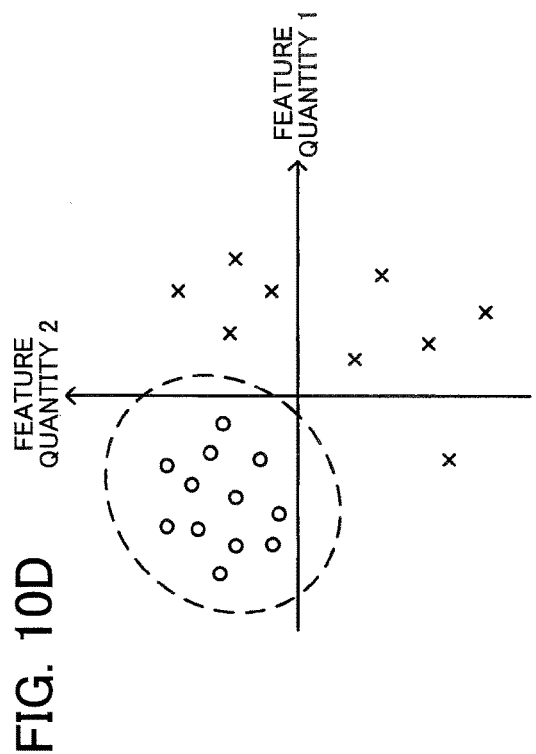
Figure 10D:
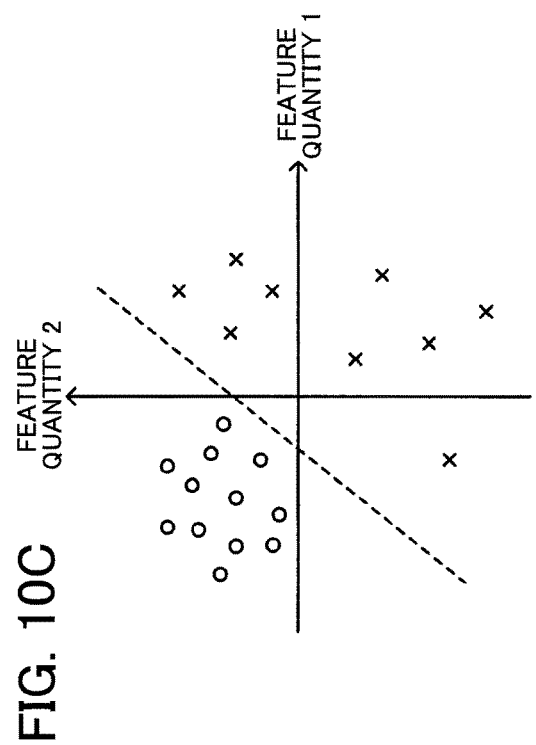

When the results illustrated in FIG. 10B have been obtained, and data that is unknown to be a correct answer or an incorrect answer has been acquired during the subsequent detection process, the object that corresponds to the acquired data is determined to be a correct answer (i.e., the desired object) when the acquired data has been plotted at the position indicated by A1 in FIG. 10B, and is determined to be an incorrect answer when the acquired data has been plotted at the position indicated by A2 in FIG. 10B. Specifically, the learning process determines the boundary between the correct answer data area and the incorrect answer data area within the feature quantity space. For example, when the results illustrated in FIG. 10B have been obtained, the boundary illustrated in FIG. 10C or 10D is calculated as the learning result. When the detection target data that is unknown to be a correct answer or an incorrect answer has been input, whether the detection target data is included in the correct answer data area or the incorrect answer data area is determined based on the boundary. The boundary may be set in various ways (see FIGS. 10C and 10D, for example). Since the learning process is known in the art, further description thereof is omitted. Although FIGS. 10A to 10D illustrate an example in which the feature quantity space is represented by a plane, the feature quantity space may be a three-dimensional or higher-dimensional space. When distinguishing first to Nth objects (and an object that differs from the first to Nth objects) from each other, a plurality of boundaries may be set within the feature quantity space.

An example of the learning process has been described above. Such a learning process is designed on the assumption that an object having given characteristics has a given (ideally identical (constant)) feature quantity. For example, the above learning process is designed on the assumption that, when a plurality of images have been acquired by capturing fat, the feature quantity calculated from each image is ideally identical. Since each position within the feature quantity space corresponds to the characteristics of the processing target data, the relationship fails, and it is impossible to appropriately set a boundary if the characteristics that correspond to an identical position are not identical. This also applies to the detection process that utilizes the learning result. Specifically, the detection result differs depending on the position within the feature quantity space at which the detection target data is plotted (see A1 and A2 in FIG. 10B). More specifically, the detection target data that corresponds to an identical object should be plotted at an identical position within the feature quantity space. The detection process is hindered if the position at which the detection target data is plotted varies (i.e., the feature quantity to be calculated varies).

However, it may be impossible to apply the above assumption depending on the distance between the imaging section and the object. For example, the imaging target of an endoscope apparatus described later with reference to FIG. 1 is tissue or the like. When capturing an image using an endoscope apparatus, it is necessary to apply illumination light to the object since ambient light (e.g., sunlight or illumination light emitted from overhead lighting) is absent. In the example illustrated in FIG. 1, light emitted from a light source section 100 is passed through a light guide fiber 201, and applied to the object through an illumination lens 203.

Since intense light is applied to an object that is situated close to the imaging section, the imaging section receives intense reflected light. On the other hand, since weak light is applied to an object that is situated away from the imaging section due to attenuation of light corresponding to the distance, the imaging section receives weak reflected light. Specifically, an object having identical characteristics (e.g., identical object) may be captured in a different color corresponding to the distance from the imaging section. Therefore, it is necessary to take account of the effects of the distance in order to implement an appropriate learning process or detection process.

Figure 11A:
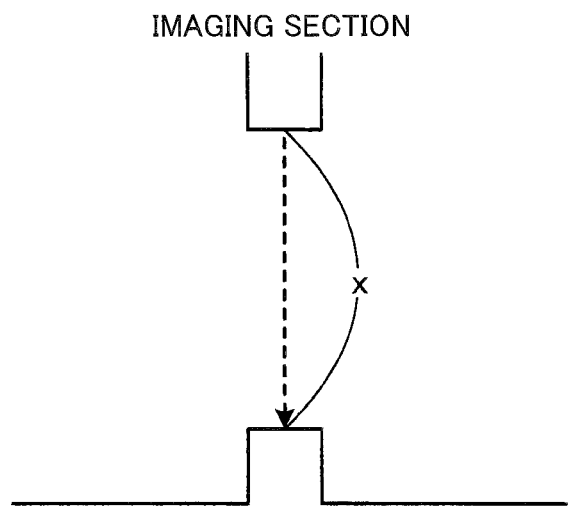
FIGS. 11A and 11B are views illustrating a change in feature quantity due to a concave-convex structure of an object.
Figure 11B:
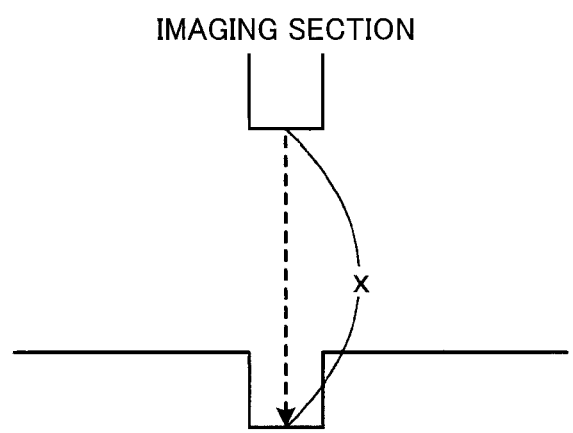

It is desirable to also take account of the effects of structural information (convexities and concavities) about the object in addition to the distance. For example, an object that corresponds to a pixel at a given position within an image is situated at a distance x from the imaging section. However, even when an object having identical characteristics is situated at the distance x from the imaging section, the intensity of light that reaches the object differs between FIG. 11A and FIG. 11B, and the object is captured in a different color or the like within the image. In FIG. 11A, the target object is part of a convex structure. Therefore, it is likely that light reflected by the object situated around the target object as well as scattered light reach the target object in addition to the illumination light that directly reaches the target object, and the target object is captured in a relatively bright state. In FIG. 11B, the target object is part of a concave structure. Therefore, it is likely that only a small amount of scattered light and the like reach the target object, and the target object is captured in a dark state as compared with FIG. 11A. As a result, the characteristics (i.e., feature quantity) observed within the image differ although the distance from the imaging section is identical.

The embodiments of the invention propose a method that performs at least one of a learning process and a detection process using distance information based on the distance from the imaging section to the object. Specifically, at least one of the learning process and the detection process is performed based on the distance, or concavity-convexity information determined based on the distance information. A plurality of distance ranges are set, and used when performing the learning process and the detection process.

JP-A-2002-342758 discloses a method that suppresses a change in feature quantity due to the distance by performing a normalization process on the image corresponding to the distance. JP-A-2002-342758 utilizes an identical normalization process (e.g., normalization expression) irrespective of the distance. However, a change in feature quantity corresponding to the distance may not be identical (i.e., a change in feature quantity may differ corresponding to the distance). For example, a change in feature quantity may be represented by $\alpha \times d$ using a constant $\alpha$ and a distance d when the distance is a first distance, and may be represented by $\beta \times d$ using a constant $\beta$ that differs from the constant $\alpha$ when the distance is a second distance. In this case, it is impossible to sufficiently compensate a change in feature quantity corresponding to the distance even when the normalization process disclosed in JP-A-2002-342758 is performed. As a result, an object having identical characteristics is plotted at a different point within the feature quantity space, and the accuracy of the detection process and the learning process deteriorates.

According to the embodiments of the invention, a plurality of distance ranges are set, and the detection process and the learning process are performed using the plurality of distance ranges. This makes it possible to accurately perform the detection process and the learning process even when it is impossible to accurately compensate a change in feature quantity using a specific correction process (e.g., when a change in feature quantity differs (changes) corresponding to the distance).

For example, a plurality of narrow distance ranges may be set, and the learning process and the detection process may be performed corresponding to each distance range. The expression "narrow distance range" means that the feature quantity is considered to be almost identical (constant) within the distance range independently of the distance. For example, when two arbitrary distance values that belong to a given distance range are referred to as dp and dq, the difference $|f(dp)-f(dq)|$ between a feature quantity f(dp) that corresponds to the distance value dp and a feature quantity f(dq) that corresponds to the distance value dq is sufficiently small irrespective of the function f. In this case, the feature quantity that belongs to one distance range may change corresponding to the distance, but it is considered that the change in feature quantity is sufficiently small.

A change in feature quantity corresponding to the distance poses a problem when the feature quantity changes by a first amount when the distance is a distance d1, and changes by a second amount when the distance is a distance d2, whereby an object having identical characteristics is plotted at a significantly different point within the feature quantity space. The method disclosed in JP-A-2002-342758 has a problem in that it is impossible to sufficiently compensate a change in feature quantity corresponding to each distance using a specific correction process when a change in feature quantity that corresponds to the distance d1 differs from a change in feature quantity that corresponds to the distance d2, for example. When a plurality of distance ranges are set as described above, the feature quantity may differ between different distance ranges. However, it is considered that the feature quantity that belongs to at least one distance range is constant (i.e., changes to only a small extent so that at least a deterioration in accuracy does not occur). Therefore, it is possible to implement a highly accurate learning process by performing the learning process (i.e., acquiring the learning result) corresponding to each of a plurality of distance ranges without taking account of a change in feature quantity corresponding to the distance (i.e., without performing a correction process and the like) (as described later with reference to FIG. 13).

In this case, it is also possible to implement a highly accurate detection process by determining the distance range that corresponds to the detection target data, and comparing the detection target data with the learning result that corresponds to the determined distance range.

Note that the learning process and the detection process that utilize a plurality of distance ranges are not limited thereto. For example, the learning process and the detection process may be performed after performing a correction process on the feature quantity in the same manner as disclosed in JP-A-2002-342758. Note that a specific correction process (i.e., correction expression in a narrow sense) is assigned to each of a plurality of distance ranges in order to achieve sufficient accuracy even when a change in feature quantity differs corresponding to the distance range. For example, when it is known that a change in feature quantity corresponding to the distance is represented by a combination of a plurality of expressions (see FIG. 2), these expressions may be linked to the distance ranges.

Figure 2:
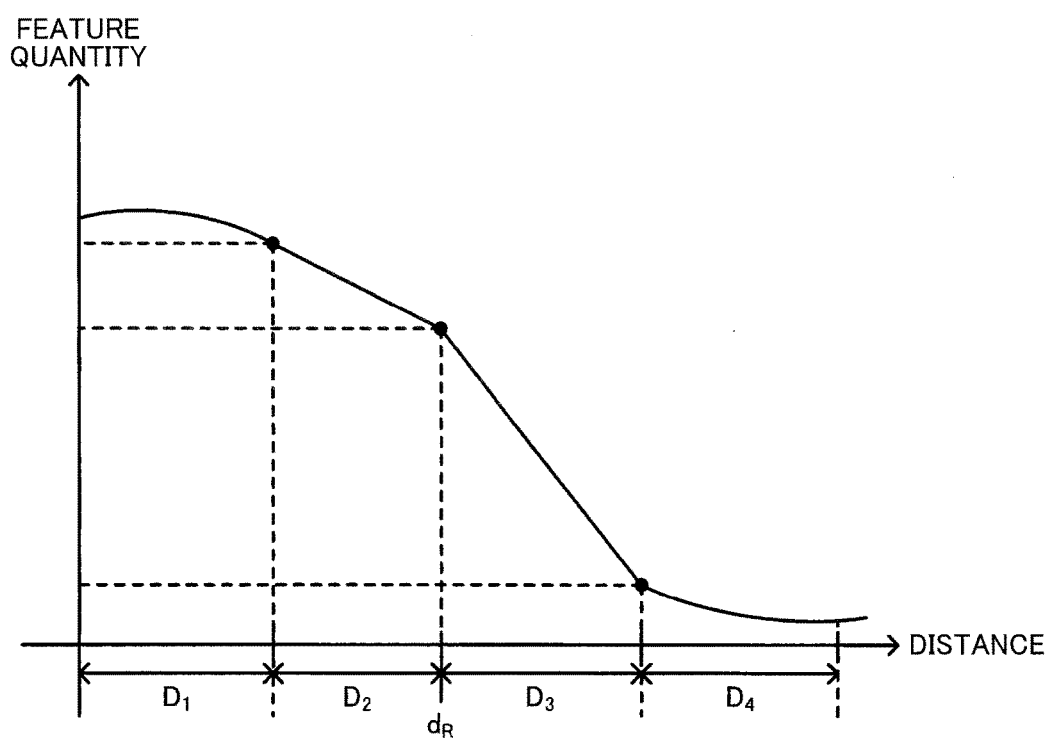
FIG. 2 illustrates an example in which a feature quantity changes in a different way corresponding to distance.

In the example illustrated in FIG. 2, a change in feature quantity corresponding to the distance is represented by a function that is not smooth as a whole. Therefore, it is difficult to implement a highly accurate correction process using a specific correction process (e.g., a correction process that utilizes a single correction expression) that is common to each distance range. However, since a change in feature quantity can be defined using a smooth function by setting four distance ranges $Z_1$ to $Z_4$, a change in feature quantity (i.e., the correction amount of the correction process) can be defined using a simple function with respect to the distance. Therefore, it is possible to easily and accurately perform the detection processing and the learning process by setting a first distance range that corresponds to the distance range $Z_1$, setting second to fourth distance ranges that respectively correspond to the distance ranges $Z_2$ to $Z_4$, and performing the process on a distance range basis, for example.

Figure 12A:
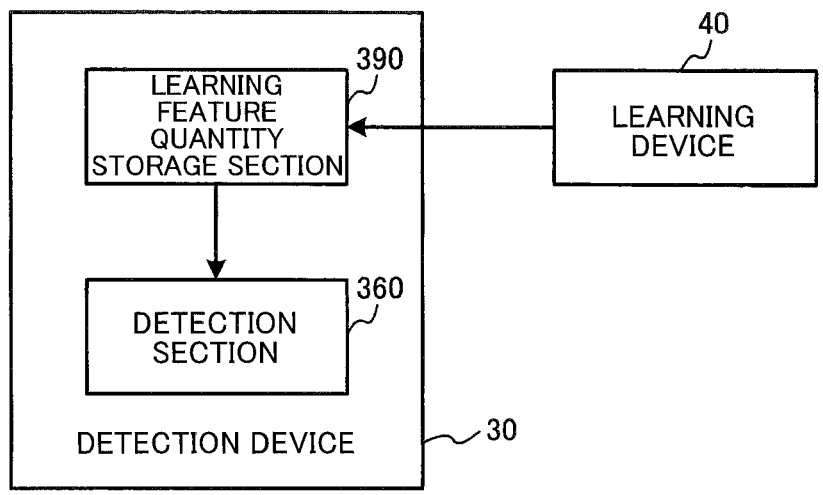
FIG. 12A illustrates an example in which a detection device and a learning device are provided separately.
Figure 12B:
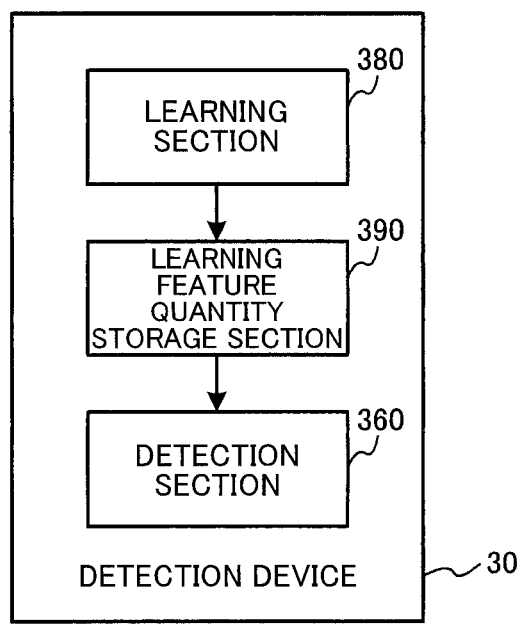
FIG. 12B illustrates an example in which a detection device includes a learning section.

Note that a learning device and a detection device may be provided separately (see FIG. 12A). In this case, the embodiments of the invention may be applied to the learning device or the detection device. The embodiments of the invention may also be applied to a detection device that includes a learning section (see FIG. 12B). In this case, the detection device performs both the learning process and the detection process. Although the following specific embodiments illustrate a detection device that includes a learning section 380 (see FIG. 12B), the following specific embodiments may similarly be applied to either the learning device or the detection device (see FIG. 12A).

2. First Embodiment

A first embodiment is described below. Although the first embodiment is described below taking an endoscope apparatus as an example, the first embodiment may similarly be applied to an apparatus other than an endoscope apparatus since the above problem due to a difference in distance or convexities and concavities similarly occurs when it is likely that it is necessary to provide illumination light due to the absence of ambient light (e.g., when capturing a dark area using a normal digital video camera). The imaging device (e.g., endoscope apparatus) and the detection device may be provided separately.

Figures 13, 14:
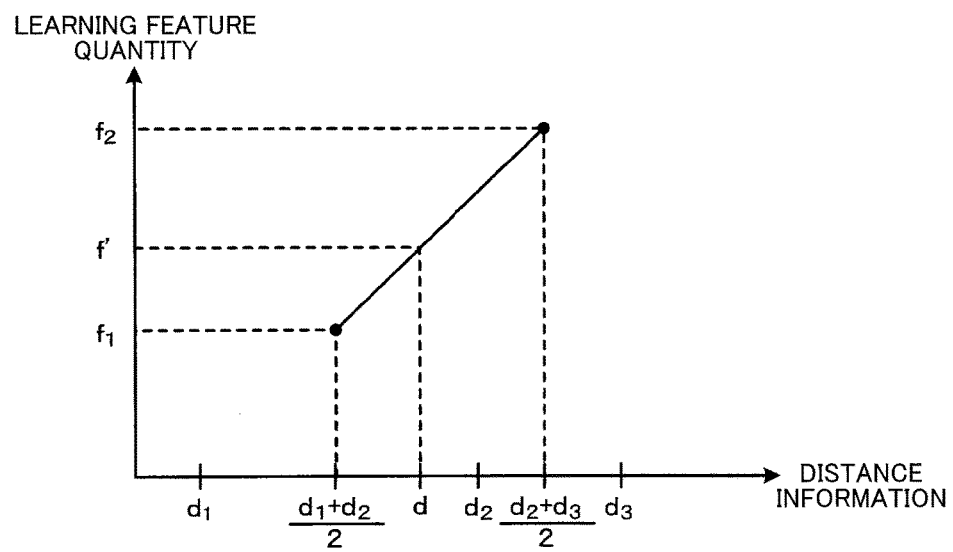
FIG. 13 is a view illustrating a process (first embodiment).
FIG. 14 is a view illustrating an interpolation process (modification (first embodiment)).

According to the first embodiment, N distance ranges are set based on the distance information, and the process is performed after determining the distance range that corresponds to the processing target data. FIG. 13 illustrates an example of the distance range determination process. In the example illustrated in FIG. 13, N distance ranges are set corresponding to the value represented by the distance information. For example, when learning data has been input, the distance range among the distance ranges 1 to N that corresponds to the learning data is determined referring to the distance information that corresponds to the learning data. The learning process is performed corresponding to the determined distance range. Therefore, the learning result (learning feature quantity) is calculated corresponding to each distance range (see FIG. 13). In this case, since the difference in distance is small within one distance range (e.g., the difference in distance within the ith distance range falls within the range $d_{i+1}-d_i$), the learning process performed corresponding to each distance range need not take account of a change in feature quantity corresponding to the distance, and it is unnecessary to perform a feature quantity correction process and the like. Specifically, the effects of the distance information are suppressed by appropriately utilizing a plurality of distance ranges, and it is not likely that it is necessary to perform a correction process corresponding to each distance range. More specifically, when performing the learning process corresponding to the ith distance range, the mean or the variance is calculated without correcting the feature quantity that corresponds to the ith distance range, or a boundary is calculated by directly plotting the feature quantity in the feature quantity space.

When the detection target data has been input, the distance range among the distance ranges 1 to N that corresponds to the detection target data is determined referring to the distance information that corresponds to the detection target data. When it has been determined that the detection target data corresponds to the ith distance range, the feature quantity represented by the detection target data is compared with the learning result $f_i$ that corresponds to the ith distance range. In this case, it is also unnecessary to correct the feature quantity represented by the detection target data.

2.1 System Configuration Example

FIG. 1 is a functional block diagram illustrating an endoscope apparatus that includes a detection device according to the first embodiment. As illustrated in FIG. 1, the endoscope apparatus includes a light source section 100, an imaging section 200, a processor section 300, a display section 400, and an external I/F section 500. Note that the configuration of the endoscope apparatus is not limited to the configuration illustrated in FIG. 1. Various modifications may be made, such as omitting some of the elements illustrated in FIG. 1, or adding other elements. Note that various modifications may also be made of the configurations illustrated in the other block diagrams.

The light source section 100 includes a white light source 101, a rotary color filter 102 that has a plurality of spectral transmittances, a rotation section 103 that drives the rotary color filter 102, and a condenser lens 104 that focuses the light that has spectral characteristics and has passed through the rotary color filter 102 on the incident end face of a light guide fiber 201.

The rotary color filter 102 includes a red color filter, a green color filter, a blue color filter, and a rotary motor.

The rotation section 103 rotates the rotary color filter 102 at a given rotational speed in synchronization with the imaging period of an image sensor 206 based on a control signal output from a control section 302 included in the processor section 300. For example, when the color filter is rotated at 20 revolutions per second, each color filter crosses the incident white light every 1/60th of a second, and the image sensor 206 captures the reflected light (R, G, or B) from the observation target, and transfers the resulting image every 1/60th of a second. Specifically, the endoscope apparatus according to the first embodiment frame-sequentially captures an R image, a G image, and a B image every 1/60th of a second, and the substantial frame rate is 20 fps.

The imaging section 200 is formed to be elongated and flexible so that the imaging section 200 can be inserted into a body cavity (e.g., stomach or large intestine), for example. The imaging section 200 includes the light guide fiber 201 that guides the light focused by the light source section 100, an illumination lens 203 that diffuses the light guided by the light guide fiber 201 to illuminate the observation target, and objective lenses 204 and 205 that focus the reflected light from the observation target. The objective lenses 204 and 205 are disposed at a given interval so that a given parallax image (hereinafter referred to as "stereo image") can be captured. The objective lenses 204 and 205 respectively form a left image and a right image on the image sensors 206 and 207.

The imaging section 200 also includes an A/D conversion section 209 that converts photoelectrically-converted analog signals output from the image sensors 206 and 207 into digital signals, a memory 210 that stores scope ID information and specific information (including a production variation) about the imaging section 200, and a connector 212 for removably connecting the imaging section 200 and the processor section 300. The image sensors 206 and 207 are monochrome single-chip image sensors (e.g., CCD image sensor or CMOS image sensor).

The images output from the image sensors 206 and 207 are converted into digital signals by the A/D conversion section 209, and output to an image processing section 301. The memory 210 is connected to the control section 302, and the scope ID information and the specific information (including a production variation) are transmitted to the control section 302.

The processor section 300 includes the image processing section 301 and the control section 302. The image processing section 301 corresponds to the detection device (and the learning device) in a narrow sense. The details of the image processing section 301 are described later.

The display section 400 is a display device (e.g., CRT or liquid crystal monitor) that can display a movie (moving image).

The external I/F section 500 is an interface that allows the user to input information to the endoscope apparatus, for example. The external I/F section 500 includes a power switch (power ON/OFF switch), a shutter button for starting an imaging operation, a mode (e.g., imaging mode) switch button (e.g., a switch for selectively performing an enhancement process on a concave-convex part present on the surface of tissue), and the like. The external I/F section 500 outputs the input information to the control section 302.

The details of the image processing section 301 are described below with reference to FIG. 3. The image processing section 301 includes a distance information acquisition section 320, an image construction section 330, a feature quantity calculation section 340, a detection section 360, an enhancement processing section 370, a learning section 380, and a learning feature quantity storage section 390.

The stereo image (left image and right image) output from the image sensors 206 and 207 included in the imaging section 200 is input to the image construction section 330 and the distance information acquisition section 320.

The distance information acquisition section 320 performs a matching calculation process on the left image (reference image) that forms the captured stereo image and a local area of the right image along an epipolar line that passes through the attention pixel (pixel in question) situated at the center of a local area of the left image to calculate the position at which the maximum correlation is obtained as a parallax. The distance information acquisition section 320 converts the calculated parallax into the distance in a Z-direction to acquire distance information (distance map in a narrow sense). The acquired distance information is output to the detection section 360 and the learning section 380.

Note that the distance information acquisition process may be implemented in various other ways. For example, the distance information may be acquired (calculated) using a Time-of-Flight method that utilizes infrared light or the like. When using the Time-of-Flight method, blue light may be used instead of infrared light, for example. In this case, the imaging section 200 need not have a stereo configuration.

The image construction section 330 performs given image processing (e.g., OB process, gain process, and γ process) on the captured stereo image to generate an image that can be output from the display section 400. The resulting image is output to the feature quantity calculation section 340 and the enhancement processing section 370.

The feature quantity calculation section 340 calculates the feature quantity relating to the object from the image output from the image construction section 330. Various types of information (e.g., color information and shape information) may be used as the feature quantity, and such information can be calculated using various methods known in the art (see above). Therefore, detailed description thereof is omitted. The calculated feature quantity is output to the detection section 360 and the learning section 380.

The detection section 360 compares a learning feature quantity that has been set by the learning process performed by the learning section 380, and stored in the learning feature quantity storage section 390 with the feature quantity output from the feature quantity calculation section 340, and performs the detection process. Specifically, since the feature quantity output from the feature quantity calculation section 340 is linked to the distance information output from the distance information acquisition section 320, the detection section 360 determines the distance range to which the feature quantity belongs based on the distance information. For example, when it has been determined that the feature quantity corresponds to (belongs to) the distance range k (ID=k) (see FIG. 13), the feature quantity is compared with the learning feature quantity $f_k$ that corresponds to the distance range k. For example, a pixel having a feature quantity for which the Mahalanobis distance from the learning feature quantity is equal to or shorter than a threshold value may be set to be the detection target. When the boundary is set within the feature quantity space as described above, the detection target may be determined whether or not the data is included within the correct answer data area.

The enhancement processing section 370 performs an enhancement process on the detected area, and outputs the resulting data to the display section 400.

The learning section 380 calculates the feature quantity (learning feature quantity) used for the detection process using the feature quantity output from the feature quantity calculation section 340, and the distance information (that corresponds to the feature quantity) output from the distance information acquisition section 320. The calculation result is stored in the learning feature quantity storage section 390. In the example illustrated in FIG. 13, when the feature quantity and the distance information that correspond to given learning data have been input, the distance range is determined based on the distance information. For example, when it has been determined that the distance range is the distance range k (ID=k), the feature quantity is used for the learning process that calculates the learning feature quantity $f_k$. The details of the learning process are described later. When implementing supervised learning, given data is input together with the correct answer/incorrect answer information. The user may input the information through the external I/F section 500, for example. In this case, the learning section 380 performs the learning process using the information input through the external I/F section 500, the feature quantity output from the feature quantity calculation section 340 that corresponds to the information input through the external I/F section 500, and the distance information output from the distance information acquisition section 320.

2.2 Learning Process

Figure 4:
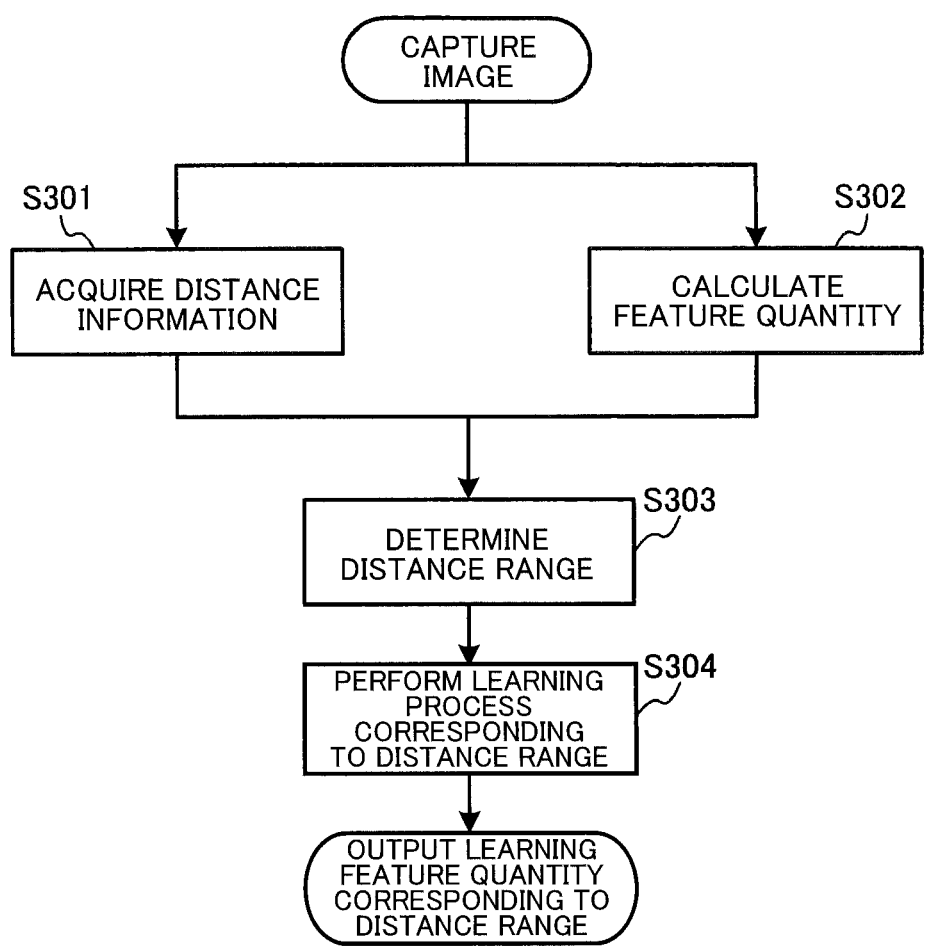
FIG. 4 is a flowchart illustrating a learning process (first embodiment).

FIG. 4 illustrates the flow of the learning process. When the captured image has been acquired, the distance information is acquired (S301), and the feature quantity is calculated (S302) based on the acquired captured image. When using the Time-of-Flight method, the distance information is acquired based on sensor information output from a range sensor. Therefore, it is unnecessary to acquire the distance information using an image. Examples of the feature quantity include the color, the brightness, the color difference, the spectrum (e.g., reflectance, transmittance, or radiance), and the like.

The distance range is determined based on the distance information (S303). The feature quantity is learned corresponding to the distance range, and the learning feature quantity is output (S304). For example, the mean, the variance, or the like of the input feature quantity is calculated corresponding to the distance range. When using the mean or the variance, the learning feature quantity (learning result) is a set of feature quantities (or one feature quantity). Note that a process that calculates a classification model that corresponds to the boundary within the feature quantity space may be performed as the learning process. When implementing supervised learning, the correct answer/incorrect answer information is acquired together with the feature quantity. In this case, a process that acquires the correct answer/incorrect answer information (not illustrated in FIG. 4) is performed in addition to the steps S301 and S302, and the learning process is performed in the step S304 using the corrected feature quantity and the correct answer/incorrect answer information.

For example, when N distance ranges have been set as illustrated in FIG. 13, the step S304 is performed corresponding to each of the first to Nth distance ranges (i.e., the step S304 is performed N times). Therefore, N learning feature quantities $f_1$ to $f_N$ are acquired.

2.3 Detection Process

Figure 5:
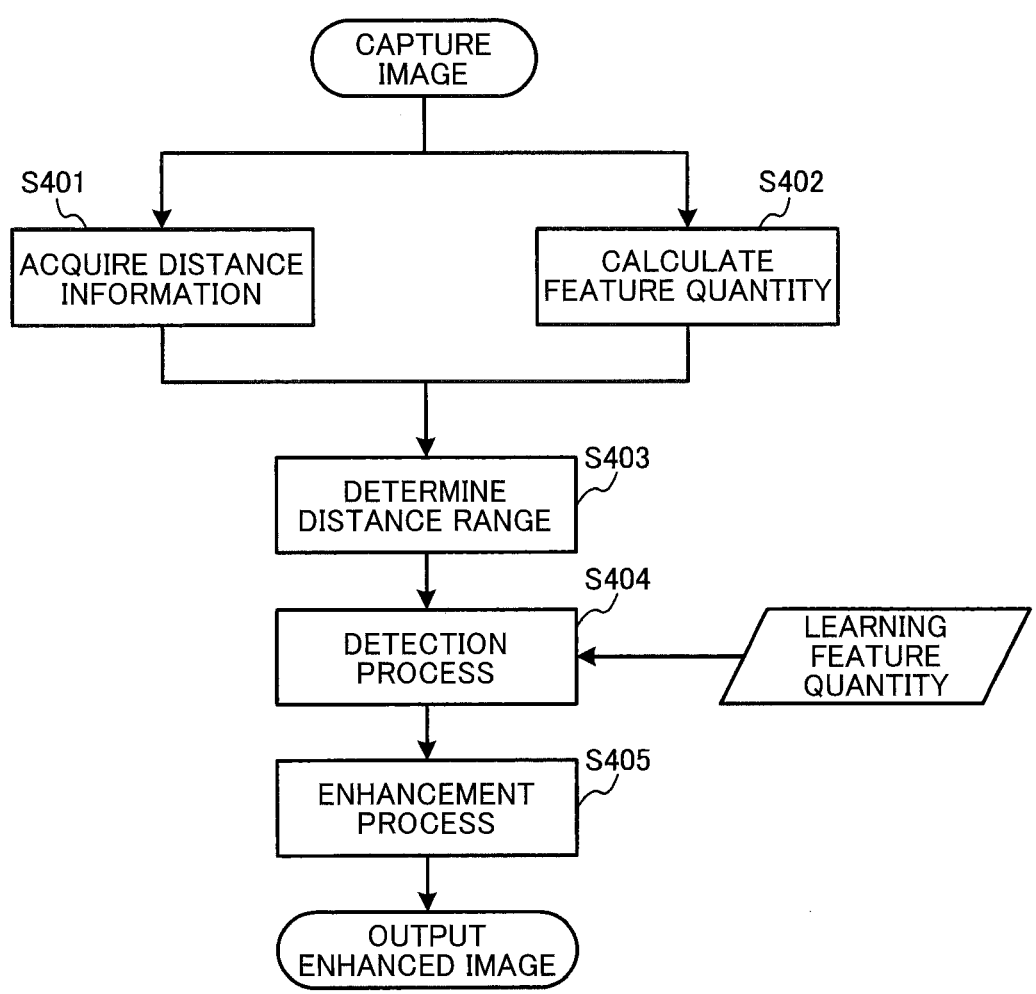
FIG. 5 is a flowchart illustrating a detection process (first embodiment).

FIG. 5 illustrates the flow of the detection process. When the captured image has been acquired, the distance information is acquired (S401), and the feature quantity is calculated (S402) based on the acquired captured image in the same manner as in the case of performing the learning process.

The distance range is determined based on the distance information (S403) in the same manner as in the case of performing the learning process. The feature quantity is compared with the learning feature quantity (among the N learning feature quantities) that corresponds to the distance range determined in the step S403, and whether or not to detect the target area is determined (S404). For example, the mean and the variance are calculated during the learning process, and the Mahalanobis distance is calculated to detect a pixel for which the Mahalanobis distance is equal to or shorter than a threshold value, or a pixel within the correct answer data boundary is detected based on the positional relationship with the boundary set within the feature quantity space.

The enhancement processing section 370 performs the enhancement process based on the detected area information (S405). The enhancement process may be implemented using a method that colors the detected area, and superimposes the detected area on the input image, or a method that changes the color (e.g., increases the brightness, changes the hue, or increases the chroma) corresponding to the detected area, for example.

2.4 Modification that Utilizes Concavity-Convexity Information as Distance Information The correction process may be performed using the concavity-convexity information about the object (see above). In this case, a change in feature quantity corresponding to the distance occurs since a concave part (groove) is captured in a dark state, and a convex part is captured in a bright state. In this modification, a plurality of distance ranges may be set based on the depth or the width of a concave part (groove) or the height or the width of a convex part instead of the distance (distance value) from the imaging section 200. For example, the above configuration can be similarly applied when the distance d (see FIG. 13) is the depth or the height of a concave part or a convex part in the optical axis direction of the imaging section 200 with respect to a reference plane, a concave part has a positive value (or a negative value), and a convex part has a negative value (or a positive value). An example of a process that extracts extracted concavity-convexity information about a concave-convex structure from the distance information about the object is described below.

Since a convex part tends to be captured to be bright, and a concave part tends to be captured to be dark, a plurality of distance ranges are set so as to absorb the difference therebetween. However, when the height of the convex part is small, or the depth of the concave part is small, or the convexities and concavities are gentle, it is considered that the effects of the concave-convex structure on the feature quantity within the image are small. Specifically, it is unnecessary to extract all of the concave-convex structures of the object, and it suffices to extract convexities and concavities having dimensions that affect the brightness. A method that sets an extraction process parameter based on known characteristic information, and extracts the extracted concavity-convexity information from the distance information using an extraction process that utilizes the extraction process parameter is described below. Specifically, a concave-convex part having the desired dimensional characteristics (i.e., a concave-convex part having a width within the desired range in a narrow sense) is extracted as the extracted concavity-convexity information using the known characteristic information. Since the three-dimensional structure of the object is reflected in the distance information, the distance information includes the desired concave-convex part, and a structure that differs in dimensions from the desired concave-convex part. Specifically, the extracted concavity-convexity information acquisition process is a process that excludes an unnecessary structure from the distance information. The extraction process parameter is determined based on the known characteristic information, and the extracted concavity-convexity information is extracted based on the determined extraction process parameter.

A low-pass filtering process that uses a given size (N×N pixels) is performed on the input distance information to extract rough distance information. The extraction process parameter is adaptively determined based on the extracted rough distance information. The details of the extraction process parameter are described later. The extraction process parameter may be the morphological kernel size (i.e., the size of a structural element) that is adapted to the distance information at the plane position orthogonal to the distance information of the distance map, a filter having low-pass characteristics adapted to the distance information at the plane position, or a filter having high-pass characteristics adapted to the plane position, for example. Specifically, the extraction process parameter is change information that changes an adaptive nonlinear or linear low-pass filter or high-pass filter that corresponds to the distance information. Note that the low-pass filtering process is performed to suppress a decrease in the accuracy of the extraction process that may occur when the extraction process parameter changes frequently or significantly corresponding to the position within the image. The low-pass filtering process may not be performed when a decrease in the accuracy of the extraction process does not occur.

The extraction process is performed based on the determined extraction process parameter to extract only the concave-convex parts of the object having the desired size. The extracted concave-convex parts are output as the extracted concavity-convexity information (concavity-convexity image) having the same size as that of the captured image (i.e., the image subjected to the enhancement process). The detection process and the learning process calculate the dimensions (e.g., the depth, the height, and the width of convexities and concavities) of the object that has been determined to be a concave part or a convex part based on the extracted irregularity information, and determine the distance range corresponding to the calculated dimensions.

Figure 16A:
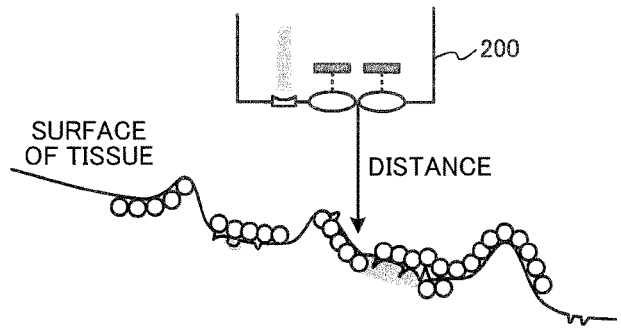

The details of the extraction process parameter determination process are described below with reference to FIGS. 16A to 16F. In FIGS. 16A to 16F, the extraction process parameter is the diameter of a structural element (sphere) that is used for an opening process and a closing process (morphological process). FIG. 16A is a view schematically illustrating the surface of the object and the vertical cross section of the imaging section 200.

The extraction process parameter determination process determines the extraction process parameter for extracting only a concave-convex part (10, 20, and 30 in FIG. 1) that may affect the brightness from the surface of the object without extracting a relatively large structure (2, 3, and 4 in FIG. 1).

In this case, it is necessary to use dimensional information (e.g., width, height, and depth) about the extraction target concave-convex part. It is possible to extract only the desired concave-convex part by determining the diameter of the sphere applied to the surface of the object during the opening process and the closing process by utilizing the dimensional information. The diameter of the sphere is set to be smaller than the size of the global structure, and larger than the size of the desired concave-convex part. FIGS. 16A to 16F illustrate an example in which a sphere that satisfies the above conditions is used for the opening process and the closing process.

Figure 16B:
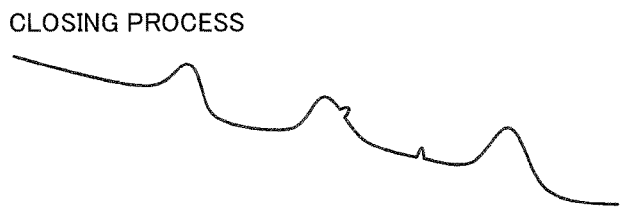
Figure 16C:

FIG. 16B illustrates the surface of the object after the closing process has been performed. As illustrated in FIG. 16B, information in which the concave parts among the concave-convex parts having the extraction target dimensions are filled while maintaining the global structure is obtained by determining an appropriate extraction process parameter (i.e., the size of the structural element). The concave parts of the surface of the object (tissue) can be extracted (see FIG. 16C) by calculating the difference between the information obtained by the closing process and the original surface of the object (see FIG. 16A).

Figure 16D:
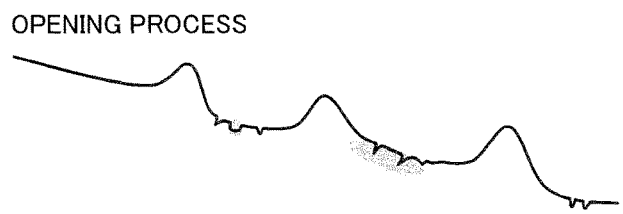
Figure 16E:
Figure 16E:
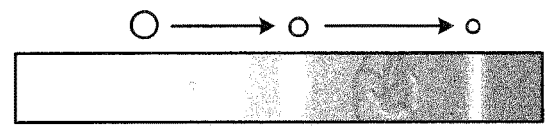

FIG. 16D illustrates the surface of the object after the opening process has been performed. As illustrated in FIG. 16D, information in which the convex parts among the concave-convex parts having the extraction target dimensions are removed is obtained by the opening process. The convex parts of the surface of the object can be extracted (see FIG. 16E) by calculating the difference between the information obtained by the opening process and the original surface of the object.

The opening process and the closing process may be performed on the surface of the object using a sphere having an identical size. However, since the stereo image is characterized in that the area of the image formed on the image sensor decreases as the distance represented by the distance information increases, the diameter of the sphere may be increased when the distance represented by the distance information is short, and may be decreased when the distance represented by the distance information is long in order to extract a concave-convex part having the desired size.

FIG. 16F illustrates an example in which the diameter of the sphere is changed with respect to the average distance information when performing the opening process and the closing process on the distance map. Specifically, it is necessary to correct the actual size of the surface of the object using the optical magnification so as to coincide with the pixel pitch of the image formed on the image sensor in order to extract the desired concave-convex part with respect to the distance map. Therefore, it is desirable to acquire the optical magnification or the like of the imaging section 200 that is determined based on the scope ID information.

The process that determines the size of the structural element (extraction process parameter) is performed so that the exclusion target shape is not deformed (i.e., the sphere moves to follow the exclusion target shape) when the process that utilizes the structural element is performed on the exclusion target shape (when the sphere is moved on the surface in FIG. 16A). The size of the structural element may be determined so that the extraction target concave-convex part (extracted concavity-convexity information) is removed (i.e., the sphere does not enter the concave part or the convex part) when the process that utilizes the structural element is performed on the extraction target concave-convex part. Since the morphological process is a well-known process, detailed description thereof is omitted.

The extraction process is not limited to the morphological process. The extraction process may be implemented using a filtering process. For example, when using a low-pass filtering process, the characteristics of the low-pass filter are determined so that the extraction target concave-convex part can be smoothed, and the exclusion target structure can be maintained. Since the characteristics of the extraction target concave-convex part and the exclusion target structure can be determined from the known characteristic information, the spatial frequency characteristics thereof are known, and the characteristics of the low-pass filter can be determined.

The low-pass filter may be a known Gaussian filter or bilateral filter. The characteristics of the low-pass filter may be controlled using a parameter $\sigma$, and a $\sigma$ map corresponding to each pixel of the distance map may be generated. When using a bilateral filter, the $\sigma$ map may be generated using either or both of a brightness difference parameter $\sigma$ and a distance parameter $\sigma$. Note that the term "brightness" used herein in connection with the brightness difference parameter $\sigma$ refers to the pixel value when the distance map is considered to be an image, and the brightness difference refers to the difference in distance in the Z-direction. The term "distance" used herein in connection with the distance parameter $\sigma$ refers to the distance between the attention pixel (pixel in question) and its peripheral pixel in the XY-direction. A Gaussian filter is represented by the following expression (1), and a bilateral filter is represented by the following expression (2).

$$f(x) = \frac{1}{N}\exp\left(-\frac{(x-x0)^2}{2\sigma^2}\right) \quad (1)$$

$$f(x) = \frac{1}{N}\exp\left(-\frac{(x-x0)^2}{2\sigma_c^2}\right) \times \exp\left(-\frac{(p(x)-p(x0))^2}{2\sigma_v^2}\right) \quad (2)$$

For example, a σ map subjected to a thinning process may be generated, and the desired low-pass filter may be applied to the distance map using the σ map.

The parameter σ that determines the characteristics of the low-pass filter is set to be larger than a value obtained by multiplying the pixel-to-pixel distance D1 of the distance map corresponding to the size of the extraction target concave-convex part by α (>1), and smaller than a value obtained by multiplying the pixel-to-pixel distance D2 of the distance map corresponding to the size of the lumen and the folds specific to the observation target part by β (<1). For example, the parameter σ may be calculated by σ=(α*D1+β*D2)/2*Rσ.

Steeper sharp-cut characteristics may be set as the characteristics of the low-pass filter. In this case, the filter characteristics are controlled using a cut-off frequency fc instead of the parameter σ. The cut-off frequency fc may be set so that a frequency F1 in the cycle D1 does not pass through, and a frequency F2 in the cycle D2 does pass through. For example, the cut-off frequency fc may be set to fc=(F1+F2)/2*Rf.

Note that Rσ is a function of the local average distance. The output value increases as the local average distance decreases, and decreases as the local average distance increases. Rf is a function that is designed so that the output value decreases as the local average distance decreases, and increases as the local average distance increases.

A concavity image can be output by extracting only a negative area obtained by subtracting the low-pass filtering results from the distance map that is not subjected to the low-pass filtering process. A convexity image can be output by extracting only a positive area obtained by subtracting the low-pass filtering results from the distance map that is not subjected to the low-pass filtering process.

Figure 17A:
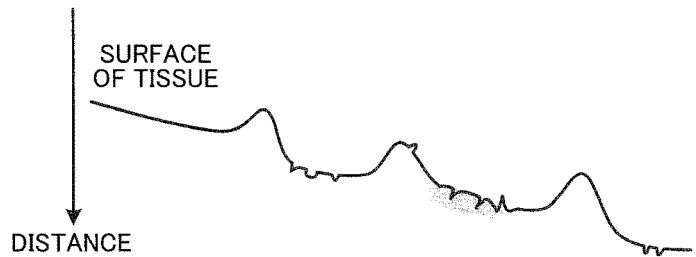
FIGS. 17A to 17D are views illustrating a process that extracts extracted concavity-convexity information using a filtering process.
Figure 17B:
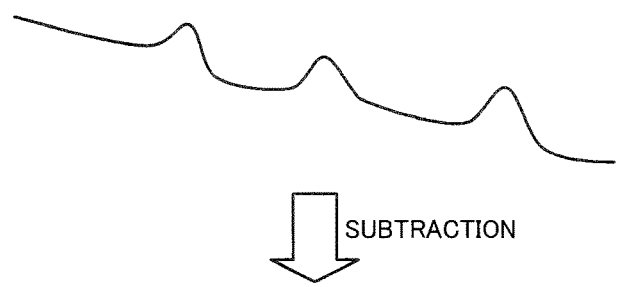
Figure 17C:
Figure 17D:
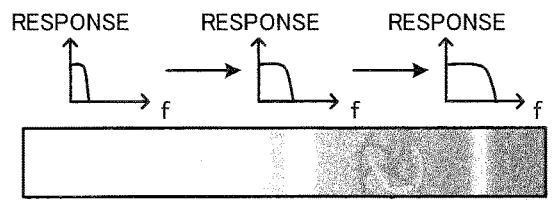

FIGS. 17A to 17D illustrate extraction of the desired concave-convex part using the low-pass filter. As illustrated in FIG. 17B, information in which the concave-convex parts having the extraction target dimensions are removed while maintaining the global structure is obtained by performing the filtering process that utilizes the low-pass filter on the distance map illustrated in FIG. 17A. Since the low-pass filtering results serve as a reference for extracting the desired concave-convex parts (see FIG. 17B) even if the opening process and the closing process (see FIGS. 16A to 16F) are not performed, the concave-convex parts can be extracted (see FIG. 17C) by performing a subtraction process on the original distance map (see FIG. 17A). When using the morphological process, the size of the structural element is adaptively changed corresponding to the rough distance information. When using the filtering process, it is desirable to change the characteristics of the low-pass filter corresponding to the rough distance information. FIG. 17D illustrates an example in which the characteristics of the low-pass filter are changed corresponding to the rough distance information.

A high-pass filtering process may be performed instead of the low-pass filtering process. In this case, the characteristics of the high-pass filter are determined so that the extraction target concave-convex part of tissue due to a lesion is maintained while removing the structure of the lumen and the folds specific to the observation target part.

The filter characteristics of the high-pass filter are controlled using a cut-off frequency fhc, for example. The cut-off frequency fhc may be set so that the frequency F1 in the cycle D1 passes through, and the frequency F2 in the cycle D2 does not pass through. For example, the cut-off frequency fhc may be set to fhc=(F1+F2)/2*Rf. Note that Rf is a function that is designed so that the output value decreases as the local average distance decreases, and increases as the local average distance increases.

The extraction target concave-convex part can be extracted by the high-pass filtering process. Specifically, the extracted concavity-convexity information is acquired directly (see FIG. 17C) without performing a subtraction process (difference calculation process).

2.5 Modification that Performs Interpolation Process on Learning Results that Correspond to a Plurality of Distance Ranges The basic method according to the first embodiment performs a closed process corresponding to each distance range, and does not perform a process corresponding to a plurality of distance ranges. In this modification, an interpolation process is performed on the learning results corresponding to a plurality of distance ranges during the detection process. When the distance information that corresponds to the detection target data represents $d_2-\Delta$ ($\Delta$ is a very small positive number) that is very close to the distance $d_2$ (see FIG. 13), the detection target data corresponds to the distance range 1, and the comparison target used for the detection process is the learning feature quantity $f_1$. However, the value $d_2-\Delta$ represented by the distance information is considered to be closer to the value $d_2$ that corresponds to the distance range 2 than the value $d_1$ that corresponds to the distance range 1. Specifically, when the detection target data that corresponds to the distance information that represents a value in the vicinity of the boundary between the distance ranges has been input, it may be likely that the detection target data has characteristics close to the characteristics that correspond to the adjacent distance range. Therefore, it is considered that it is possible to set the learning feature quantity that is more appropriate for the input detection target data, and improve the detection accuracy by utilizing the learning feature quantities that correspond to the adjacent distance ranges in combination.

When the number of distance ranges is small, the input distance information may considerably differ from the average distance of the distance range (e.g., the distance value $d_2-\Delta$ that corresponds to the distance range 1 may considerably differ from the average distance $(d_1+d_2)/2$ of the distance range 1). When the number of distance ranges is too large, it is unlikely that the input distance information considerably differs from the average distance of the distance range. In this case, however, the number of pieces of learning data corresponding to each distance range may be insufficient. When the number of pieces of learning data is small, the reliability of the learning feature quantity (learning result) deteriorates. The interpolation process is also effective in such a situation. Specifically, an improvement in accuracy can be achieved by utilizing the learning results corresponding to a plurality of distance ranges in combination, even when the reliability of one learning feature quantity is low.

FIG. 14 illustrates an example of the interpolation process. In FIG. 14, the horizontal axis indicates the value represented by the distance information, and the vertical axis indicates the learning feature quantity. $d_1$, $d_2$, and $d_3$ correspond to the boundary value between the distance ranges (see FIG. 13). FIG. 14 illustrates an example in which the interval between the boundary values $d_1$ and $d_2$ is not equal to the interval between the boundary values $d_2$ and $d_3$. $f_1$ is the learning feature quantity that corresponds to the distance range 1 illustrated in FIG. 13, and $f_2$ is the learning feature quantity that corresponds to the distance range 2 illustrated in FIG. 13. In FIG. 14, the learning feature quantity $f_1$ corresponds to $(d_1+d_2)/2$, and the learning feature quantity $f_2$ corresponds to $(d_2+d_3)/2$. d in FIG. 14 is the value represented by the distance information that corresponds to the input detection target data. When using the basic method according to the first embodiment, since the value d satisfies the relationship $d_1 \leq d < d_2$, the learning feature quantity $f_1$ is used as the comparison target. According to this modification, the interpolation process is performed on the learning feature quantity $f_1$ that corresponds to the distance range 1 and the learning feature quantity $f_2$ that corresponds to the distance range 2 since the value d is close to the boundary value $d_2$. In the example illustrated in FIG. 14, the learning feature quantity f' that is calculated by a linear interpolation process is used as the comparison target.

Note that the interpolation process is not limited to the example illustrated in FIG. 14. For example, a nonlinear interpolation process may be performed instead of the linear interpolation process illustrated in FIG. 14. When the number of distance ranges is large, and the reliability of the learning feature quantity that corresponds to each distance range is low, the interpolation process may be performed on three or more learning feature quantities so that a further improvement in accuracy can be achieved.

Figure 6:
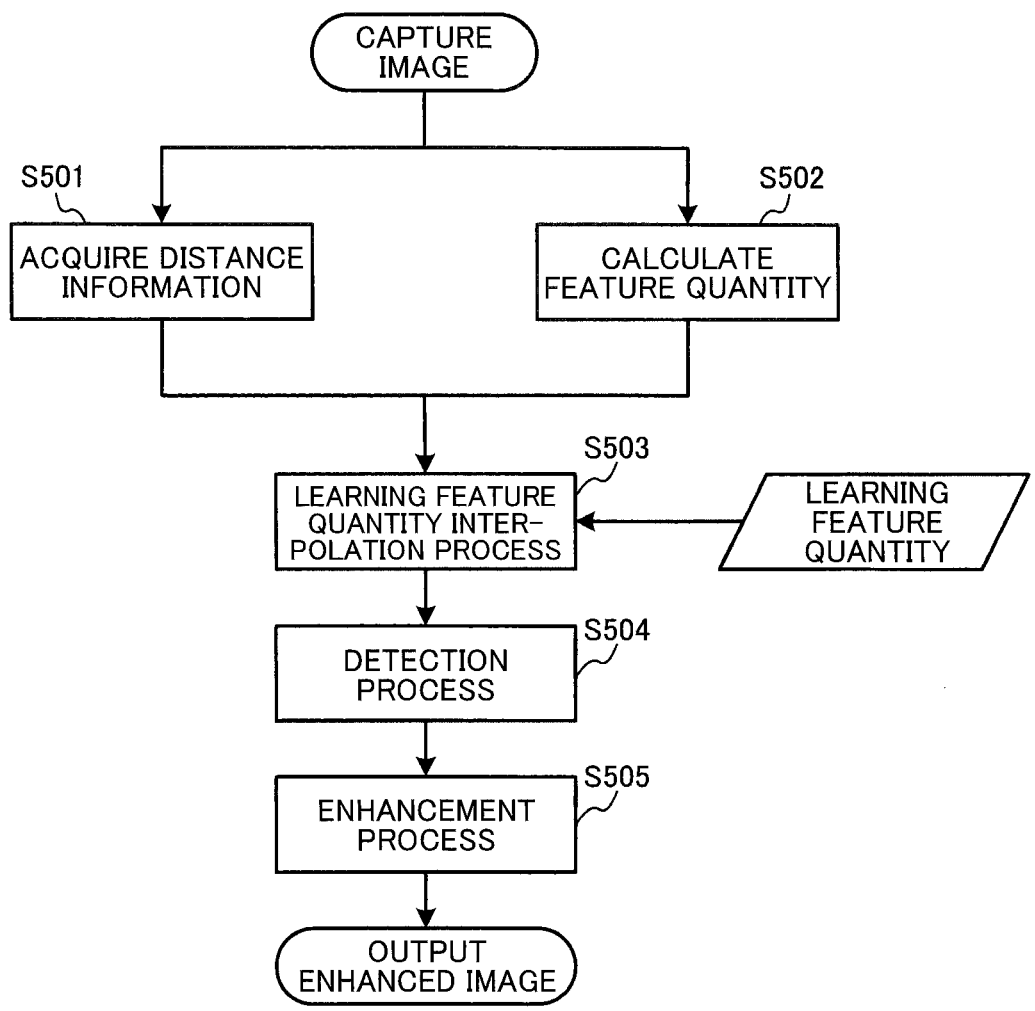
FIG. 6 is a flowchart illustrating a detection process (modification (first embodiment)).

FIG. 6 illustrates the flow of the detection process according to this modification. In FIG. 6, a learning feature quantity interpolation process (S503) is additionally provided as compared with FIG. 5. Specifically, the interpolation process is performed based on the distance information that corresponds to the detection target data, and the resulting data is used for the detection process (S504) instead of directly using the learning feature quantity acquired by the learning process.

2.6 Specific Example

Figure 3:
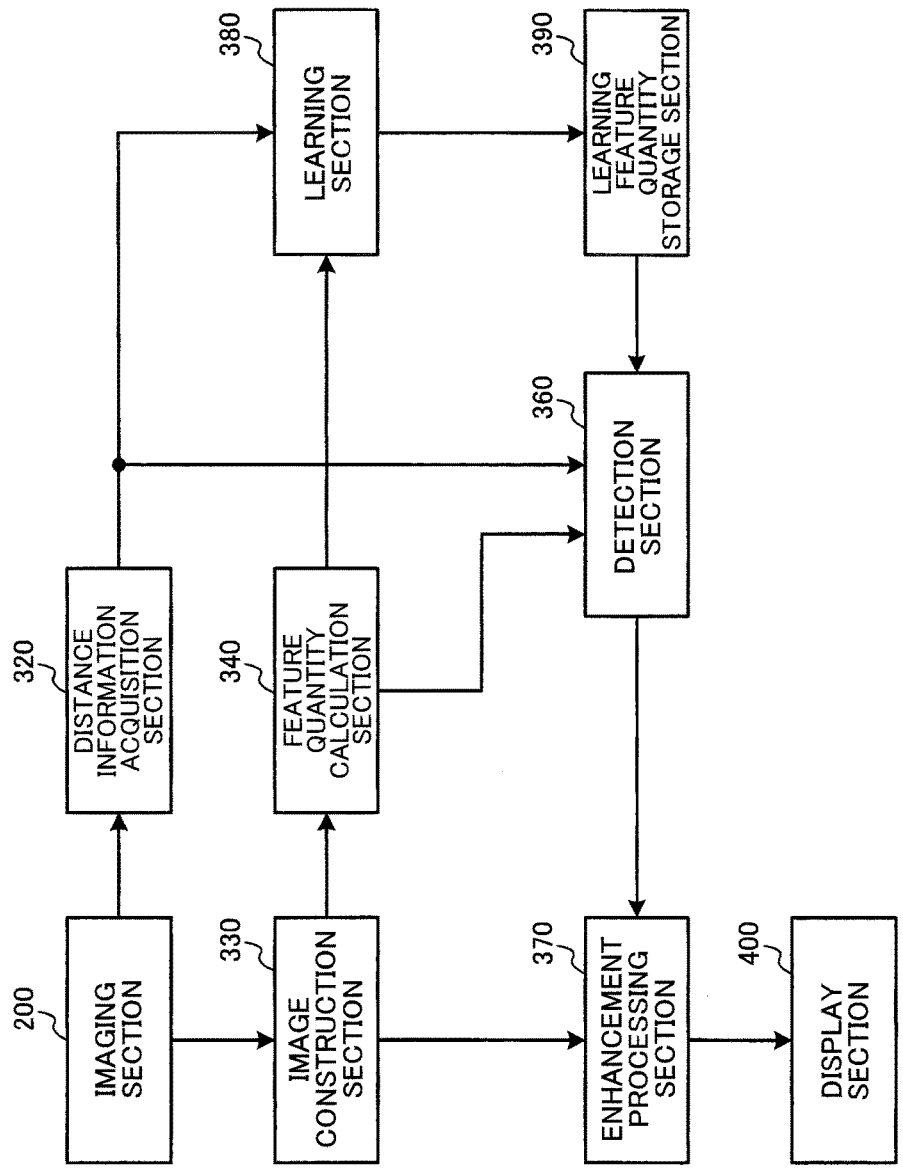
FIG. 3 illustrates a configuration example of a detection device (first embodiment).

According to the first embodiment, the detection device (corresponding to the image processing section 301 included in the endoscope apparatus illustrated in FIG. 1) includes an image acquisition section (corresponding to the image construction section 330) that acquires an image that has been captured by the imaging section 200, and includes an image of an object, the distance information acquisition section 320 that acquires the distance information based on the distance from the imaging section 200 to the object when the imaging section 200 captured the image, the feature quantity calculation section 340 that calculates the feature quantity relating to the object from the acquired image, the learning feature quantity storage section 390 that stores the learning feature quantity that has been calculated by the learning process corresponding to each of a plurality of distance ranges that are set corresponding to the distance from the imaging section 200 to the object, and the detection section 360 that detects the target area from the image based on the learning feature quantity, the distance information, and the feature quantity (see FIG. 3). The detection section 360 determines the distance range that corresponds to the feature quantity calculated by the feature quantity calculation section 340 from the plurality of distance ranges based on the distance information acquired by the distance information acquisition section 320, and detects the target area based on the learning feature quantity that corresponds to the determined distance range, and the feature quantity calculated by the feature quantity calculation section 340.

The term "learning feature quantity" used herein includes information that represents the learning result. When a process that calculates the mean or the variance of the feature quantities respectively represented by a plurality of pieces of learning data is performed as the learning process, the learning result represents the mean or the variance of the feature quantities. Therefore, information that represents the learning result may be included in the learning feature quantity. When the learning result represents the boundary (classification model in a broad sense) within the feature quantity space (see FIGS. 10C and 10D), it may be considered that the learning result does not represent the feature quantity. However, the term "learning feature quantity" is used herein to refer to a wide range of information obtained by the learning process that uses the feature quantity, and includes the classification model and the like. The learning process corresponding to each distance range is not limited to the process that calculates the learning result corresponding to each distance range (i.e., the process that calculates the learning results in a number corresponding to the number of distance ranges) (see above). For example, the feature quantity may be corrected using a correction method that is set corresponding to each distance range, and the learning result may be calculated using the corrected feature quantity corresponding to a plurality of distance ranges (i.e., all of the distance ranges in a narrow sense) (i.e., a single learning result is calculated) (see the second embodiment).

This makes it possible to detect the target area from the image based on the distance information about the distance from the imaging section 200 to the object, the feature quantity calculated from the image, and the learning feature quantity (i.e., the result of the learning process). As described above, an object having given characteristics may appear to have different characteristics within the image due to a difference in distance or a difference in structure (see FIGS. 11A and 11B). In order to accurately detect an object having given characteristics from the image, it is necessary to suppress a change in characteristics within the image during the learning process and the detection process. According to the first embodiment, the desired object is accurately detected by utilizing the distance information in view of the fact that the distance or the structure of the surface of the object can be acquired based on the distance information. Specifically, a change in feature quantity corresponding to the distance is absorbed by setting a plurality of distance ranges, and determining an appropriate distance range during the detection process.

The learning feature quantity storage section 390 included in the detection device may store a plurality of learning results as the learning feature quantity, the plurality of learning results being acquired by performing the learning process corresponding to each of the plurality of distance ranges that are set based the distance, and the detection section 360 may determine the distance range that corresponds to the feature quantity calculated by the feature quantity calculation section 340 from the plurality of distance ranges based on the distance information acquired by the distance information acquisition section 320, and detect the target area based on the learning feature quantity that corresponds to the determined distance range, and the feature quantity calculated by the feature quantity calculation section 340.

According to this configuration, it is possible to suppress the effects of a difference in distance on the feature quantity within the image by setting a plurality of distance ranges (see FIG. 13). When it is desired to also suppress the effects of a concave-convex structure, the distance ranges may be set taking account of the effects of a concave-convex structure (not illustrated in FIG. 13). For example, each distance range illustrated in FIG. 13 may be subdivided corresponding to a structure (e.g., a concave part, a convex part, and a part other than a concave part and a convex part). In this case, 3×N distance ranges may be set, and a change in feature quantity of an object having given characteristics (within the image) is small within each distance range in the same manner as described above. Since a related-art method (e.g., the normalization process disclosed in JP-A-2002-342758) uses a single correction expression, it is impossible to change the correction expression corresponding to the distance, for example. According to the first embodiment, it is possible to deal with such a situation since a change in feature quantity is small within each distance range.

The detection section 360 may determine first to Mth (M is an integer equal to or larger than 2) distance ranges that correspond to the feature quantity calculated by the feature quantity calculation section 340 from the plurality of distance ranges based on the distance information acquired by the distance information acquisition section 320, perform the interpolation process on first to Mth learning feature quantities that correspond to the determined first to Mth distance ranges to calculate an interpolated feature quantity, and detect the target area based on the calculated interpolated feature quantity and the feature quantity calculated by the feature quantity calculation section 340.

According to this configuration, it is possible to perform the detection process with higher accuracy by performing the interpolation process on the learning feature quantities (see the modification). Specifically, this configuration is useful when the number of distance ranges is small, and a change in feature quantity within each distance range may not be small, or when the number of distance ranges is large, and the reliability of the learning feature quantity is low since the number of pieces of learning data corresponding to each distance range is small, for example.

The detection device may include the learning section 380 that performs the learning process on the feature quantity that has been calculated by the feature quantity calculation section 340 and corresponds to the object based on the distance information acquired by the distance information acquisition section 320 (see FIG. 3). The learning feature quantity storage section 390 may store the result of the learning process performed by the learning section 380 as the learning feature quantity.

According to this configuration, since the detection device 30 includes the learning section 380 (see FIG. 12B), the detection process and the learning process can be implemented by the detection device 30. In this case, since the image obtained by capturing the target of the detection process can be used for the learning process, it is possible to implement a learning process that further reflects the characteristics of the target of the detection process. For example, the detection target tissue observed using a medical endoscope may differ in feature quantity (e.g., color) depending on the subject. In this case, the detection range may be increased, or may be limited to a range close to the average value and the median value during the learning process from the viewpoint of improving versatility. Therefore, the detection range may include a feature quantity that cannot be possessed by the target tissue of a given subject, or the color of the target tissue of a given subject may fall outside the detection range. Since learning that takes account of an individual variation can be achieved by performing the learning process using an image obtained by capturing the actual subject, the detection accuracy can be improved as compared with the case of using a versatile learning result. In this case, it is considered that individual learning is performed using the results of versatile learning. In such a case, the user may input teacher data (that represents whether or not the processing target is correct answer data) corresponding to the situation.

The detection device may include the enhancement processing section 370 that performs the enhancement process on the target area detected by the detection section 360 (see FIG. 3).

This makes it possible to perform the enhancement process on the detected target area. The enhancement process may be a process that improves visibility, for example. When the target area is fat, it is possible to improve the effect of suppressing nerve damage by improving the visibility of an area in which it is likely that nerves are present.

The first embodiment may be applied to a learning device that includes an image acquisition section (corresponding to the image construction section 330) that acquires an image that has been captured by the imaging section 200, and includes an image of an object, the distance information acquisition section 320 that acquires the distance information based on the distance from the imaging section 200 to the object when the imaging section 200 captured the image, the feature quantity calculation section 340 that calculates the feature quantity relating to the object from the acquired image, the learning section 380 that performs the learning process on the feature quantity corresponding to each of a plurality of distance ranges that are set corresponding to the distance information acquired by the distance information acquisition section 320, and the learning feature quantity storage section 390 that stores the learning feature quantity calculated by the learning process performed by the learning section 380.

This makes it possible to implement a learning device that performs the learning process corresponding to each of a plurality of distance ranges that are set corresponding to the distance information. It is important to suppress the effects of a difference in distance or a difference in structure during the learning process in order to improve the detection accuracy.

Note that part or most of the processes performed by the detection device or the learning device according to the first embodiment may be implemented by a program. In this case, the detection device, the learning device, or the like according to the first embodiment is implemented by causing a processor (e.g., CPU) to execute a program. Specifically, a program stored in a non-transitory information storage device is read, and executed by a processor (e.g., CPU). The information storage device (computer-readable device) stores a program, data, and the like. The function of the information storage device may be implemented by an optical disk (e.g., DVD or CD), a hard disk drive (HDD), a memory (e.g., memory card or ROM), or the like. The processor (e.g., CPU) performs various processes according to the first embodiment based on the program (data) stored in the information storage device. Specifically, a program that causes a computer (i.e., a device that includes an operation section, a processing section, a storage section, and an output section) to function as each section according to the first embodiment (i.e., a program that causes a computer to execute the process implemented by each section) is stored in the information storage device.

The detection device or the learning device and the like according to the embodiments of the invention may include a processor and a memory. The processor may be a central processing unit (CPU), for example Note that the processor is not limited to a CPU. Various types of processors such as a graphics processing unit (GPU) and a digital signal processor (DSP) may also be used. The processor may be a hardware circuit such as an application specific integrated circuit (ASIC). The memory stores a computer-readable instruction. Each section of the detection device or the learning device and the like according to the embodiments of the invention is implemented by causing the processor to execute the instruction. The memory may be a semiconductor memory (e.g., SRAM or DRAM), a register, a hard disk, or the like. The instruction may be an instruction included in an instruction set of a program, or may be an instruction that causes a hardware circuit of the processor to operate.

3. Second Embodiment

Figure 15:
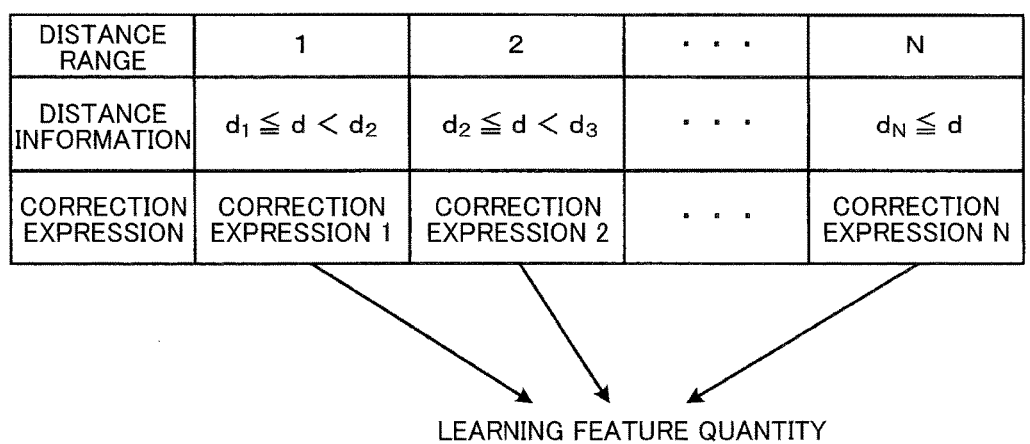
FIG. 15 is a view illustrating a process (second embodiment).

A second embodiment is described below. In the second embodiment, the correction process is performed on the feature quantity after determining the distance range. FIG. 15 is a view illustrating the second embodiment. In the second embodiment, N distance ranges are set corresponding to the distance information in the same manner as in the first embodiment. In the second embodiment, the learning process is not performed corresponding to each distance range, and a correction expression is linked to each distance range. When given learning data has been input, and it has been determined that the learning data corresponds to the distance range i based on the distance information that corresponds to the learning data, the feature quantity represented by the learning data is corrected using a correction expression i. The learning process is performed using the feature quantity subjected to the correction process that corresponds to the distance range to calculate a single learning feature quantity.

The second embodiment differs from a method that uses a single (identical) correction expression irrespective of the distance in that the correction expression can be changed corresponding to the distance information. The second embodiment differs from the first embodiment in that, while the first embodiment is designed so that the learning process is performed corresponding to each distance range to calculate the learning feature quantity corresponding to each distance range, the second embodiment is designed so that only one learning feature quantity is used.

For example, when a change in feature quantity with respect to a change in distance information is not smooth, or includes a linear part and a nonlinear part (see FIG. 2), it is difficult to appropriately perform the correction process using a simple method that calculates the correction amount or the corrected feature quantity using a single function fD. According to the second embodiment, since the correction expression can be set corresponding to each distance range, it is possible to implement a flexible correction process.

Figure 7:
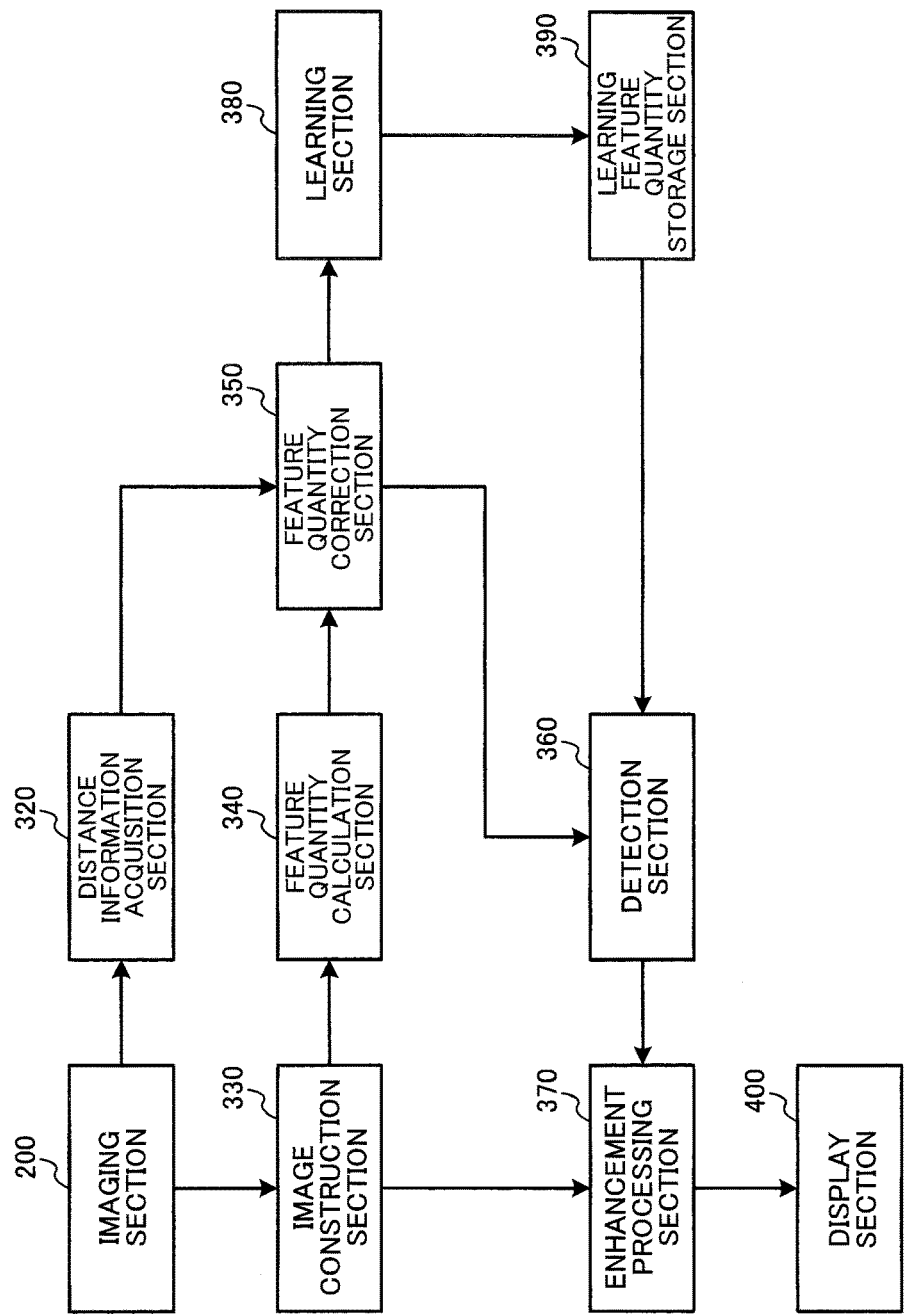
FIG. 7 illustrates a configuration example of a detection device (second embodiment).

FIG. 7 illustrates the configuration of an image processing section 301 according to the second embodiment. In FIG. 7, a feature quantity correction section 350 is provided in addition to the elements illustrated in FIG. 3. The distance information acquisition section 320 and the feature quantity calculation section 340 are connected to the feature quantity correction section 350. The feature quantity correction section 350 is connected to the detection section 360 and the learning section 380.

The feature quantity correction section 350 determines the distance range that corresponds to the feature quantity that corresponds to the distance information output from the distance information acquisition section 320 based on the distance information. The feature quantity correction section 350 performs the correction process on the feature quantity using the correction method (correction expression in a narrow sense) that corresponds to the determined distance range. For example, when a change in feature quantity changing corresponding to the distance occurs as illustrated in FIG. 2, the feature quantity correction section 350 performs the correction process that compensates the change in feature quantity.

The corrected feature quantity is output to the detection section 360 and the learning section 380. Specifically, the learning section 380 calculates a single learning feature quantity corresponding to a plurality of distance ranges (see FIG. 15). The detection section 360 compares the corrected feature quantity with the learning feature quantity.

Figure 8:
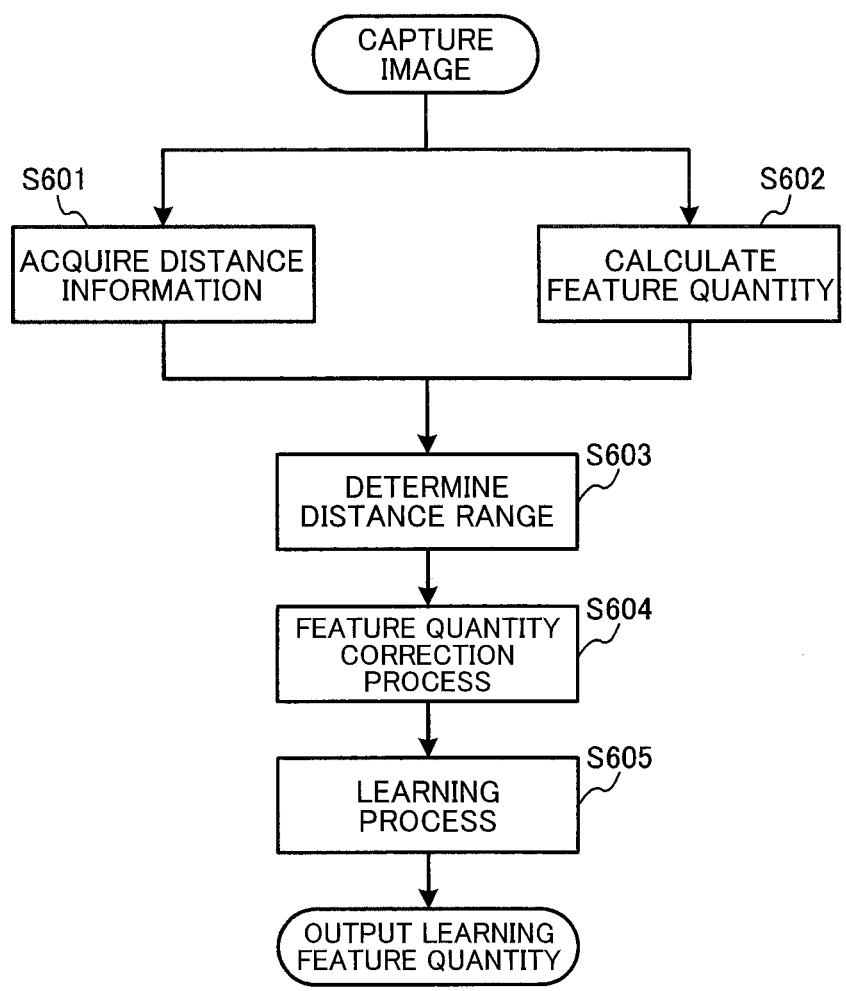
FIG. 8 is a flowchart illustrating a learning process (second embodiment).
Figure 9:
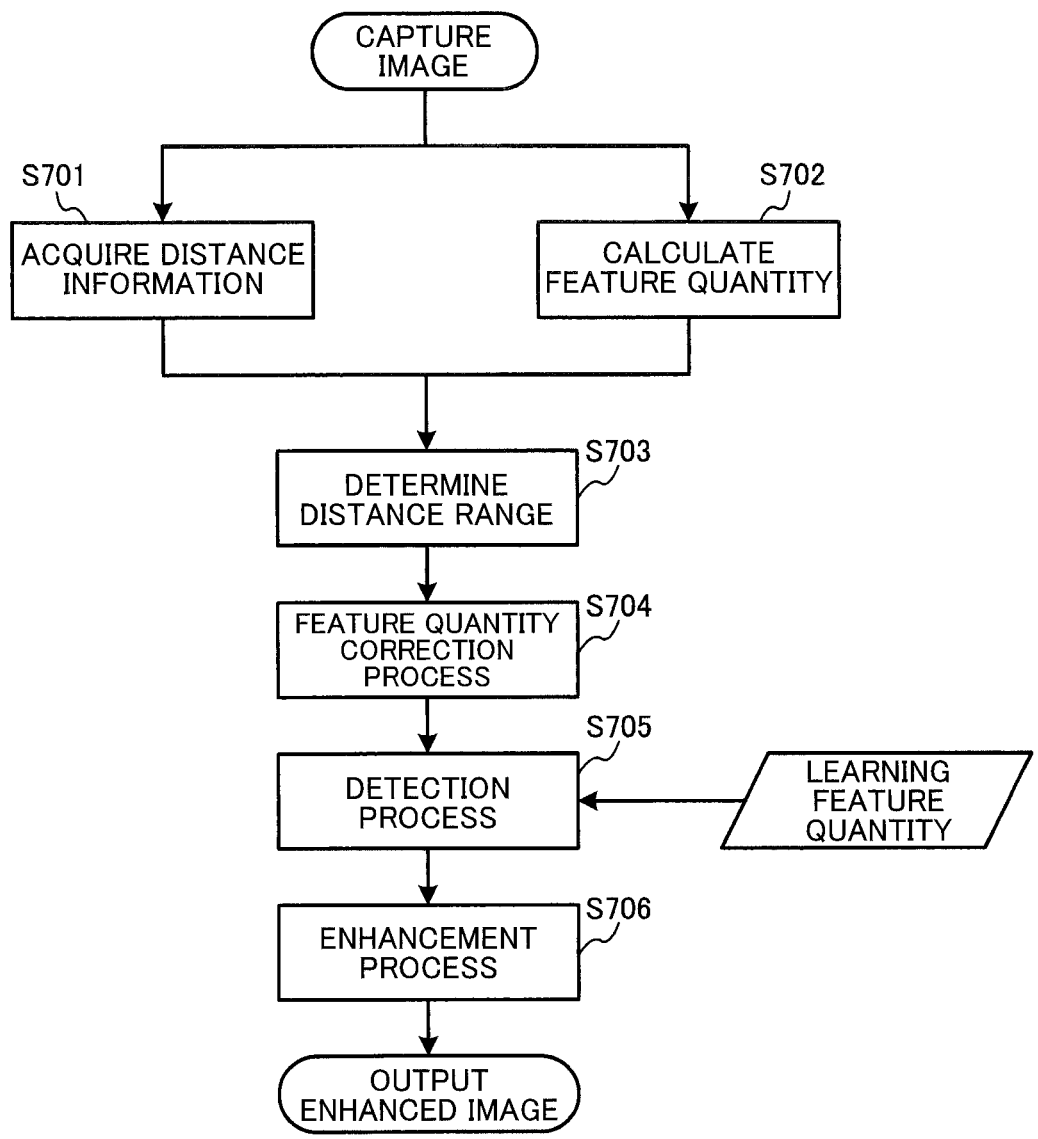
FIG. 9 is a flowchart illustrating a detection process (second embodiment).

FIG. 8 illustrates the flow of the learning process according to the second embodiment, and FIG. 9 illustrates the flow of the detection process according to the second embodiment. As illustrated in FIG. 8, the distance information and the feature quantity are acquired (S601 and S602), the distance range is determined (S603), and the correction process that corresponds to the determined distance range is performed on the feature quantity (S604). The learning process is then performed using the feature quantity subjected to the correction process (S605).

As illustrated in FIG. 9, the distance information and the feature quantity are acquired (S701 and S702), the distance range is determined (S703), and the correction process that corresponds to the determined distance range is performed on the feature quantity (S704). The detection process is then performed using the feature quantity subjected to the correction process, and the learning feature quantity calculated in the step S605 in FIG. 8 (S705), and the detected object is enhanced (S706).

According to the second embodiment, the learning feature quantity storage section 390 included in the detection device may store the learning feature quantity based on the feature quantity that has been subjected to the correction process based on the distance, and the detection section 360 may perform the correction process on the feature quantity calculated by the feature quantity calculation section 340 based on the distance information acquired by the distance information acquisition section 320, and detect the target area based on the feature quantity subjected to the correction process and the learning feature quantity.

According to this configuration, it is possible to improve the accuracy of the detection process by performing the correction process on the feature quantity based on the distance information. The correction process may be a correction process that compensates a change in feature quantity due to a difference in distance information, or compensates a change in feature quantity due to a difference in concave-convex structure of the object that can be acquired based on the distance information. The correction process performed on a concave-convex part may change the correction amount corresponding to the depth or the width of a concave part, or the height or the width of a convex part. According to this configuration, since a change in feature quantity within the image due to the distance information or a concave-convex structure can be suppressed, an object having given characteristics also has the given (identical (constant) in a narrow sense) characteristics within the image independently of the distance and the structure, and the detection process can be performed with high accuracy.

The learning feature quantity storage section 390 may store learning results as the learning feature quantity when first to Nth (N is an integer equal to or larger than 2) distance ranges have been set based on the distance, and first to Nth correction processes that respectively correspond to the first to Nth distance ranges have been set, the learning results being calculated by performing the correction process that corresponds to the corresponding distance range on a plurality of feature quantities, and the detection section 360 may determine an ith (i is an integer that satisfies 1≤i≤N) distance range that corresponds to the feature quantity calculated by the feature quantity calculation section from the first to Nth distance ranges based on the distance information acquired by the distance information acquisition section 320, perform an ith correction process that corresponds to the determined ith distance range on the feature quantity, and detect the target area based on the learning feature quantity and the feature quantity subjected to the ith correction process.

According to this configuration, it is possible to perform the detection process with higher accuracy by determining the distance range, and performing the correction process that corresponds to the determined distance range on the feature quantity (see above). In this case, it is possible to change the correction process (e.g., correction expression) corresponding to the distance (differing from a method that determines the correction process independently of the distance). Since the learning process is performed using the feature quantity subjected to the correction process, one learning result is basically acquired, and it is unnecessary to perform the interpolation process (see the modification of the first embodiment).

In order to perform the detection process with high accuracy, a value acquired by the learning process that takes account of a plurality of distance ranges that are set corresponding to the distance from the imaging section 200 to the object is stored as the learning feature quantity. The detection device according to the second embodiment may not include the learning device 40 that performs the learning process (see FIG. 12A). In this case, since the method for acquiring the learning data that is input during the learning process is not limited, the process that utilizes a plurality of distance ranges may not be performed during the learning process. For example, the problem that may occur in connection with the feature quantity acquired from the captured image can be solved without taking account of a plurality of distance ranges by providing an environment in which the object can be captured at a constant brightness independently of the distance from the imaging section by adjusting the placement of the light source or the like. When implementing a process that detects given tissue from an in vivo image, it is indispensable to capture an image using the endoscope apparatus during the detection process. However, when tissue that does not change in feature quantity (e.g., color characteristics) after removal is the detection target, it is possible to arbitrarily set the imaging environment by utilizing the removed tissue during the learning process. However, since the entire object is captured at a given reference distance independently of the actual distance information when such an ideal environment is provided, the distance from the imaging section 200 to the object is taken into consideration. Specifically, the expression "learning process based on a plurality of distance ranges that are set corresponding to the distance from the imaging section to the object" may be interpreted as "learning process based on the distance from the imaging section to the object". The expression "learning process based on the distance from the imaging section to the object" is not limited to a case where a process that utilizes the distance information is performed during the learning process, but covers an arbitrary learning process that reflects the distance. For example, the expression "learning process based on the distance from the imaging section to the object" includes a learning process that utilizes the above ideal environment.

In view of the above points, the distance range determination process and the correction process may be skipped during the learning process. Specifically, the learning feature quantity storage section 390 may store the learning feature quantity calculated by the "learning process based on the distance to the object" from the imaging section 200, and the detection section 360 may determine an ith (i is an integer that satisfies 1≤i≤N) distance range that corresponds to the feature quantity calculated by the feature quantity calculation section from the first to Nth distance ranges based on the distance information acquired by the distance information acquisition section 320, and perform an ith correction process that corresponds to the determined ith distance range on the feature quantity, and detect the target area based on the learning feature quantity and the feature quantity subjected to the ith correction process.

The first and second embodiments to which the invention is applied, and the modifications thereof, have been described above. Note that the invention is not limited to the first and second embodiments and the modifications thereof. The elements may be modified in various ways within the scope of the invention when implementing the invention. A plurality of elements among the elements described above in connection with the first and second embodiments and the modifications thereof may be appropriately combined to implement various configurations. For example, an arbitrary element may be omitted from the elements described above in connection with the first and second embodiments and the modifications thereof. The elements described above in connection with the first and second embodiments and the modifications thereof may be appropriately combined. Any term cited with a different term having a broader meaning or the same meaning at least once in the specification and the drawings can be replaced by the different term in any place in the specification and the drawings. Specifically, various modifications and applications are possible without materially departing from the novel teachings and advantages of the invention.

The invention claimed is:

1. A detection device comprising:
a processor comprising hardware, wherein the processor is configured to:
  acquire an acquired image of an object, wherein the acquired image has been captured by an image sensor;
  acquire distance information based on a distance from the image sensor to the object when the image sensor captured the acquired image;
  calculate a feature quantity relating to the object from an area of the acquired image;
  access a memory configured to store a learning feature quantity,
    wherein the learning feature quantity corresponds to each of a plurality of distance ranges, and
    wherein the learning feature quantity is determined by a learning process using images captured in the each of the plurality of distance ranges; and
  perform a detection process to determine whether the area of the acquired image is a target area, wherein the detection process comprises:
    determining a distance range from the plurality of distance ranges to which the feature quantity belongs based on the distance information; and determining whether the area of the acquired image is the target area based on:
the learning feature quantity stored in the memory corresponding to the distance range determined; and
the feature quantity.

2. The detection device according to claim 1, wherein the detection process that the processor is configured to perform comprises:
determining first to Mth (M is an integer equal to or larger than 2) distance ranges, including the distance range to which the feature quantity belongs, from the plurality of distance ranges based on the distance information;
performing an interpolation process on first to Mth learning feature quantities that correspond to the first to Mth distance ranges to calculate an interpolated learning feature quantity; and
determining whether the area of the acquired image is the target area based on:
the interpolated learning feature quantity; and
the feature quantity.

3. The detection device as defined in claim 1,
the learning feature quantity storage section storing the learning feature quantity based on the feature quantity that has been subjected to a correction process based on the distance, and
the detection section performing the correction process on the feature quantity calculated by the feature quantity calculation section based on the distance information acquired by the distance information acquisition section, and detecting the target area based on the feature quantity subjected to the correction process and the learning feature quantity.

4. The detection device as defined in claim 3,
the learning feature quantity storage section storing learning results as the learning feature quantity when first to Nth (N is an integer equal to or larger than 2) distance ranges have been set based on the distance, and first to Nth correction processes that respectively correspond to the first to Nth distance ranges have been set, the learning results being calculated by performing the correction process that corresponds to the corresponding distance range on a plurality of the feature quantities, and
the detection section determining an ith (i is an integer that satisfies 1≤i≤N) distance range that corresponds to the feature quantity calculated by the feature quantity calculation section from the first to Nth distance ranges based on the distance information acquired by the distance information acquisition section, performing an ith correction process that corresponds to the determined ith distance range on the feature quantity, and detecting the target area based on the learning feature quantity and the feature quantity subjected to the ith correction process.

5. The detection device according to claim 1, wherein processor is configured to perform the learning process.

6. The detection device according to claim 1, wherein the processor is configured to perform an enhancement process on the target area detected in the detection process.

7. A learning device comprising:
a processor comprising hardware, wherein the processor is configured to:
acquire an acquired image of an object, wherein the acquired image has been captured by an image sensor;
acquire distance information based on a distance from the image sensor to the object when the image sensor captured the acquired image;
calculate a feature quantity relating to the object from an area of the acquired image;
set a plurality of distance ranges based on defined distances from the image sensor to the object;
for each distance range of the plurality of distance ranges, perform a learning process using images captured in the each distance range of the plurality of distance ranges to determine a learning feature quantity; and
control a memory to store the learning feature quantity determined in association with the each distance range.

8. A detection method comprising causing a computer to perform:
acquiring an acquired image of an object, wherein the acquired image has been captured by an image sensor;
acquiring distance information based on a distance from the image sensor to the object when the image sensor captured the acquired image;
calculating a feature quantity relating to the object from an area of the acquired image;
accessing a memory configured to store a learning feature quantity,
wherein the learning feature quantity corresponds to each of a plurality of distance ranges, and
wherein the learning feature quantity is determined by a learning process using images captured in the each of the plurality of distance ranges; and
performing a detection process to determine whether the area of the acquired image is a target area, wherein the detection process comprises:
determining a distance range from the plurality of distance ranges to which the feature quantity belongs based on the distance information; and
determining whether the area of the acquired image is the target area based on:
the learning feature quantity stored in the memory corresponding to the distance range determined; and
the feature quantity.

9. A learning method comprising causing a computer to perform:
acquiring an acquired image of an object, wherein the acquired image has been captured by an image sensor;
acquiring distance information based on a distance from the image sensor to the object when the image sensor captured the acquired image;
calculating a feature quantity relating to the object from an area of the acquired image;
setting a plurality of distance ranges based on defined distances from the image sensor to the object;
for each distance range of the plurality of distance ranges, performing a learning process using images captured in the each distance range of the plurality of distance ranges to determine a learning feature quantity; and
controlling a memory to store the learning feature quantity determined in association with the each distance range.

10. An information storage device storing a program that causes a computer to perform steps of:
acquire an acquired image of an object, wherein the acquired image has been captured by an image sensor;
acquiring distance information based on a distance from the image sensor to the object when the image sensor captured the acquired image;
calculating a feature quantity relating to the object from an area of the acquired image;
accessing a memory configured to store a learning feature quantity,
wherein the learning feature quantity corresponds to each of a plurality of distance ranges, and
wherein the learning feature quantity is determined by a learning process using images captured in the each of the plurality of distance ranges; and
performing a detection process to determine whether the area of the acquired image is a target area, wherein the detection process comprises:
determining a distance range from the plurality of distance ranges to which the feature quantity belongs based on the distance information; and
determining whether the area of the acquired image is the target area based on:
the learning feature quantity stored in the memory corresponding to the distance range determined; and
the feature quantity.

11. An information storage device storing a program that causes a computer to perform steps of:
acquiring an acquired image of an object, wherein the acquired image has been captured by an image sensor;
acquiring distance information based on a distance from the image sensor to the object when the image sensor captured the acquired image;
calculating a feature quantity relating to the object from an area of the acquired image;
setting a plurality of distance ranges based on defined distances from the image sensor to the object;
for each distance range of the plurality of distance ranges, performing a learning process using images captured in the each distance range of the plurality of distance ranges to determine a learning feature quantity; and
controlling a memory to store the learning feature quantity determined in association with the each distance range.

* * * * *